(12) United States Patent
Yokoyama et al.

(10) Patent No.: US 8,289,566 B2
(45) Date of Patent: Oct. 16, 2012

(54) LOGO DATA GENERATING METHOD, DATA STORAGE MEDIUM RECORDING THE LOGO DATA GENERATING METHOD, A COMPUTER PROGRAM PRODUCT CONTAINING COMMANDS EXECUTING THE STEPS OF THE LOGO DATA GENERATING LOGO DATA GENERATING METHOD, AND A LOGO DATA GENERATING SYSTEM

(75) Inventors: Kazuyuki Yokoyama, Nagano-ken (JP); Yukiharu Horiuchi, Nagano-ken (JP); Katsuhito Kitahara, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 890 days.

(21) Appl. No.: 11/860,203

(22) Filed: Sep. 24, 2007

(65) Prior Publication Data
US 2008/0013112 A1 Jan. 17, 2008

Related U.S. Application Data

(62) Division of application No. 10/017,087, filed on Dec. 13, 2001, now Pat. No. 7,292,369.

(60) Provisional application No. 60/317,918, filed on Sep. 7, 2001.

(30) Foreign Application Priority Data

Dec. 28, 2000 (JP) ................................ 2000-403297
Jan. 5, 2001 (JP) ................................ 2001-000671
Jan. 5, 2001 (JP) ................................ 2001-000672
Jan. 9, 2001 (JP) ................................ 2001-001849

(51) Int. Cl.
*G06K 15/02* (2006.01)
*B41J 5/30* (2006.01)

(52) U.S. Cl. .......... 358/1.2; 358/1.9; 358/2.1; 358/1.12; 358/1.13; 358/1.15; 358/1.16; 358/1.18; 358/1.6; 358/1.7; 358/500; 358/501; 358/504; 358/518; 358/520; 358/522; 358/527; 705/15; 705/16; 705/21; 705/24; 705/26.1; 705/26.4; 705/27.1; 705/35; 705/346; 705/401; 400/61; 400/65; 400/583; 400/611; 400/624; 400/642; 400/705.4; 400/705.5; 400/709.2; 400/710; 400/719; 399/16; 399/45; 399/66; 399/86; 399/190; 399/341; 399/409

(58) Field of Classification Search .................. 358/1.2, 358/1.9, 2.1, 1.12, 1.13, 1.15, 1.18, 1.6, 1.7, 358/500, 501, 504, 518, 520; 382/112, 113, 382/116, 164, 165, 167, 175, 177, 180; 399/16, 399/45, 66, 86, 190, 341, 409

See application file for complete search history.

(56) References Cited

U.S. PATENT DOCUMENTS

| | | | |
|---|---|---|---|
| 3,958,509 A | | 5/1976 | Murray et al. |
| 4,204,728 A | | 5/1980 | Goshima et al. |
| 4,422,765 A | | 12/1983 | Hoffman |
| 4,837,613 A | | 6/1989 | Paxton et al. |
| 4,860,049 A | * | 8/1989 | Toshimitsu et al. ........... 399/184 |
| 4,873,570 A | | 10/1989 | Suzuki et al. |
| 5,045,967 A | | 9/1991 | Igarashi |
| 5,111,302 A | | 5/1992 | Chan et al. |
| 5,146,346 A | | 9/1992 | Knoll |
| 5,278,641 A | | 1/1994 | Sekizawa et al. |
| 5,467,196 A | | 11/1995 | Fukushima et al. |
| 5,493,386 A | | 2/1996 | Thompson |
| 5,581,375 A | | 12/1996 | Ma |
| 5,592,298 A | | 1/1997 | Caruso |
| 5,666,215 A | | 9/1997 | Fredlund et al. |
| 5,680,230 A | | 10/1997 | Kaburagi et al. |
| 5,740,333 A | | 4/1998 | Yoh et al. |
| 5,782,567 A | | 7/1998 | Endo |
| 5,802,420 A | | 9/1998 | Garr et al. |
| 5,847,729 A | * | 12/1998 | Takahashi et al. .............. 347/43 |
| 5,874,988 A | | 2/1999 | Gu |
| 5,905,894 A | | 5/1999 | De Bonet |
| 5,930,009 A | | 7/1999 | Sato et al. |
| 5,966,461 A | | 10/1999 | Harrington |
| 5,980,133 A | * | 11/1999 | Nunokawa et al. ............. 400/61 |
| 5,982,924 A | | 11/1999 | Power et al. |
| 6,027,200 A | | 2/2000 | Takahashi et al. |
| 6,188,493 B1 | | 2/2001 | Esaki et al. |

| | | | |
|---|---|---|---|
| 6,198,469 B1 | 3/2001 | Tjandrasuwita | |
| 6,206,504 B1 | 3/2001 | Payne | |
| 6,359,695 B1 | 3/2002 | Takahashi et al. | |
| 6,377,359 B1 | 4/2002 | Higashio | |
| 6,381,348 B2 | 4/2002 | Takeo | |
| 6,450,090 B1 * | 9/2002 | Wridge, Jr. | 101/40 |
| 6,459,419 B1 | 10/2002 | Matsubayashi | |
| 6,486,966 B1 | 11/2002 | Takahashi et al. | |
| 6,490,053 B1 | 12/2002 | Takahashi et al. | |
| 6,502,923 B2 | 1/2003 | Payne | |
| 6,529,202 B2 | 3/2003 | Wu | |
| 6,559,971 B1 * | 5/2003 | Watts et al. | 358/1.2 |
| 6,628,842 B1 | 9/2003 | Nagao | |
| 6,631,967 B1 | 10/2003 | Saruta | |
| 6,647,126 B1 | 11/2003 | Wen | |
| 7,085,006 B2 | 8/2006 | Yokoyama et al. | |

FOREIGN PATENT DOCUMENTS

| | | |
|---|---|---|
| EP | 0596706 A1 | 5/1994 |
| JP | 61-208578 | 9/1986 |
| JP | 61-250722 | 11/1986 |
| JP | 62-88071 | 4/1987 |
| JP | 6360672 | 3/1988 |
| JP | 63-172662 | 7/1988 |
| JP | 63-298578 | 12/1988 |
| JP | 1-206052 | 8/1989 |
| JP | 01271276 * | 10/1989 |
| JP | 01271276 A * | 10/1989 |
| JP | 2-84364 | 3/1990 |
| JP | 2293921 | 12/1990 |
| JP | 3-121571 | 5/1991 |
| JP | 4-190466 | 7/1992 |
| JP | 4-264915 | 9/1992 |
| JP | 6-6600 | 1/1994 |
| JP | 6-24046 | 2/1994 |
| JP | 6-217048 | 8/1994 |
| JP | 6227078 | 8/1994 |
| JP | 6-88427 | 11/1994 |
| JP | 7-66974 | 3/1995 |
| JP | 7-66975 | 3/1995 |
| JP | 07-089053 A | 4/1995 |
| JP | 7175613 | 7/1995 |
| JP | 08-051536 | 2/1996 |
| JP | 08052921 | 2/1996 |
| JP | 8-84268 | 3/1996 |
| JP | 890767 | 4/1996 |
| JP | 8-169142 | 7/1996 |
| JP | 8230269 | 9/1996 |
| JP | 8-282016 | 10/1996 |
| JP | 9-66643 | 3/1997 |
| JP | 9135325 | 5/1997 |
| JP | 9-200554 | 7/1997 |
| JP | 9-247470 | 9/1997 |
| JP | 1051770 | 2/1998 |
| JP | 1086461 | 4/1998 |
| JP | 10-134178 | 5/1998 |
| JP | 10-164380 | 6/1998 |
| JP | 10148574 | 6/1998 |
| JP | 10149441 | 6/1998 |
| JP | 11-69173 | 3/1999 |
| JP | 1166294 A | 3/1999 |
| JP | 1170780 | 3/1999 |

OTHER PUBLICATIONS

ITHACA—Press Release, "Transact Technology's Color InkJet Printer Provides New Marketing Opportunities", Apr. 17, 2000, 1 page.

ITHACA—Press Release, "Transact Unveils Color InkJet Printer; Turns the World of POS Upside Down"; Apr. 17, 2000, 1 page.

ITHACA—Press Release, "Transact's New POSJet Chosen for Peripheral Systems Techtour at Retail Systems 2000", Apr. 17, 2000, 1 page.

ITHACA—Press Release, "Transact's New Color InkJet POS Printer Meets Hospitality Industr Needs and Is Also a Brand Builder", Apr. 20, 2000, 1 page.

ITHACA How to Use the PJ1000 Image Converter, Before Apr. 17, 2000, 12 pages.

* cited by examiner

*Primary Examiner* — Steven Kau

(57) ABSTRACT

A print or logo data generating system and method in which a width dimension of a printable medium is identified and original source data obtained. The processing further involves automatically resizing the source data to a predefined maximum width not greater than the width dimension of the printable medium prior to executing any user-requested changes, and displaying a first image representation of the original source data. Upon receipt of a user-requested change in the size of the original source data and a user-requested change in the number of colors of the original source data, the size change request is executed first.

10 Claims, 28 Drawing Sheets

(a)

(b)

(a)

(b)

LOGO DATA GENERATING METHOD, DATA STORAGE MEDIUM RECORDING THE LOGO DATA GENERATING METHOD, A COMPUTER PROGRAM PRODUCT CONTAINING COMMANDS EXECUTING THE STEPS OF THE LOGO DATA GENERATING LOGO DATA GENERATING METHOD, AND A LOGO DATA GENERATING SYSTEM

CONTINUING APPLICATION DATA

This application claims priority under 35 U.S.C. §119(e) on U.S. Provisional Application No. 60/317,918, filed Sep. 7, 2001, and claims priority under 35 U.S.C. §120 on U.S. application Ser. No. 10/017,087, filed Dec. 13, 2001. The content of each of the aforementioned priority applications is incorporated by reference herein in its entirety Japanese Patent application No.(s) 10/017,087, 60/317,918, is/are hereby incorporated by reference in its/their entirety.

BACKGROUND OF THE INVENTION

1. Field of the Invention

The present invention relates to a logo data generating method for generating logo data to be stored in a printer that prints internally registered logo data according to a specific print command, is connected to a data storage medium for storing a computer program that achieves the logo data generating method, to a computer program product containing executable commands for storing the logo data in the printer, and to a system for generating logo data.

2. Description of the Related Art

A logo is generally used in reference to a graphic symbol such as a trademark identifying a store or company and, as relates to the present invention, is printed on a sales receipt by a point-of-sale (POS) terminal printer. As used herein, a logo also includes advertising information, coupons, announcements or notifications, and other relatively static information that is similarly printed to a sales receipt.

It will also be noted that "color reduction" is used herein to mean reducing color depth or to convert an image to a gray scale or halftone image.

In addition to printing the purchased products, price, and other transaction information to sales receipts, modern POS terminals also commonly print a logo containing a store or company name or emblem on the receipt. Logos such as these printed by POS terminals typically contain a design graphic and decorative characters, and most logos therefore consist of image data; that is, they are image files.

Image files are typically rather large, which means there would be a noticeable increase in the time required to print each receipt if the logo data is sent to the printer each time a receipt is printed. It is also desirable to complete the checkout process, that is, register the purchased products and print the receipt to complete the transaction, as quickly as possible. Fast printing is therefore particularly desirable for a POS terminal.

Frequently printed logo data is therefore commonly stored in the non-volatile memory, or storage, of the POS terminal printer, which then reads the logo data from the non-volatile memory when a specific print command is received from the host system to print the logo. This technique eliminates the need to send the logo data (particularly image data) from the host, thus reducing the load on the host, eliminating the corresponding transmission time, and thereby significantly improving the effective print speed.

SUMMARY OF THE INVENTION

Our invention relates to the storing of this type of logo data in a printer.

The latest full-color printers are capable of printing more than 16 million colors, and can print natural, photo-quality images. Full-color logo printing is therefore also possible, but in addition to requiring a complicated image processing operation, printing in near-natural colors requires storing CMYK color separation print pattern data for cyan (C), magenta (M), yellow (Y), and black (K) images, and requires printing each of these dot patterns. Compared with monochrome printing, full-color printing is generally slower and requires a more complex print mechanism because of the image data processing requirements, the time required for the printer to receive the image data, and the actual printing process.

When printing sales receipts at the check-out counter, POS terminal printers must be capable of fast printing with a certain print quality, quiet operation, and economical operation, and full-color printing is therefore not necessarily desirable. While full-color printing is thus not necessarily needed, there is a need for reducing full-color images to a specific number of colors according to the particular printing application and printing these reduced-color images, and products meeting this need will be provided.

The primary purpose of a POS printer is printing detailed information about sales transactions, including the purchased products and price information, to a sales receipt and journal paper. Color printing has therefore been a relatively low priority need with POS printers, and the latent need for color printing has not been particularly recognized.

Sales receipts issued from POS printers record for the customer what products were purchased and the purchase price, and are handed directly to the customer after the purchased products have been registered and the sales transaction is completed. Sales receipts are therefore also a medium for conveying information. Many customers read the receipt to confirm the product and price information. Many customers also refer to the receipt to record their purchases in a home budget ledger after returning home. Receipts are thus individually handed to the customer and contain information that is important to the customer. Receipts are therefore fundamentally different from common flyers and advertisements, and are often treated by the customer as a record containing important personal information.

As noted above, customers often check the content of the receipt in order to confirm transaction content. It therefore follows that by printing information of interest to the customer on the receipt, the information can be reliably conveyed to the customer. In this case, however, it is also desirable to differentiate this message information as much as possible.

For example, product promotions and announcements can be printed on a sales receipt, and these can be made more effective by printing them in color using photographs, images, letters, and other text (referred to below as "promotional images") similarly to conventional logo printing.

Because receipts are handed directly and individually to each customer, their ability to get the attention of, and appeal to, the customer is noticeably greater than normal print advertisements. Color image information in particular is an effective means of getting the customer's attention and attracts attention every time the customer checks the receipt. Printing this advertising information on receipts is therefore particularly effective as an advertising and sales promotion tool.

Color POS printers are typically not full-color printers because of reasons relating to print speed and economy as noted above, and can only print using a few specific colors (such as red and black, for example). Even though the number of printable colors may be limited, POS systems that can print color images can be used as a sales promotion tool rather than simply a terminal for registering sales transactions. POS systems equipped with color printers are therefore expected to become dominant POS products in the sales and distribution industry.

Once it is possible to print color logos and logo printing is used for more applications, it will also be desirable to be able to change logo size, assign different colors, adjust image resolution, and otherwise freely and frequently edit the logo (print information) according to the promotional information and images to be printed. As the types of logo data increase, recycling logo data currently or previously used for printing notifications and announcements, coupons, advertisements, and other applications by slightly changing the logo data content will also become common.

With conventional POS terminals, however, the internally stored logo data is first created using a graphics program, and a separate program is then used to store the logo data in the printer. Software for producing a logo by reducing a full-color image to the printable colors and then storing the logo data in a printer has also been available, but the color reduction process whereby the colors in a full-color image are reduced and assigned to the specific printable colors of the printer has assigned colors to fixed, predetermined colors. The problem with this is that the logo then cannot be created as desired using a different color combination or color reduction method. It is therefore difficult to produce a logo optimized for a particular purpose, and the color POS printer cannot be most effectively used.

Furthermore, the original image (source data) may consist of multiple image or text data objects (referred to simply below as "objects"). For producing logo data by converting the source data to 2-color or 3-color image data according to the printing capacity of the printer, it is desirable that the software enables the applying of not only the color reduction process uniformly to all of the source data image, but also enables the applying of different color reduction processes to different objects in the source data.

Specifically because the number of printable colors is limited, the printable colors must be effectively used in order to create logo matching for the particular printing purpose. The logo editor therefore preferably enables the user to select from as many different color expression methods as possible. If there are two or more printable colors, a color other than black can also always be used, it is desirable to create gray scale images using a color other than black for expressiveness. Furthermore, if the source image consists of two or more objects, it is desirable that gray scale processing be separately applied to the different objects. Consider, for example, being able to print black and blue for an image containing a blue sky as a background object and another object in the foreground. It will be obvious that a significantly different impression can be made if the sky object can be expressed with different shades of blue, and foreground objects can be printed with a gray scale of black, than if the image contains only one shade of blue and different shades of black.

When creating a logo it is also desirable to be able to compare on the same screen both the source images from which the logo is made and the result of the color reduction and color assignment processes applied to the source images. To accomplish this two images must be displayed on the same screen, which is often done by displaying the images at a reduced size. It is also preferable for the logo to print as displayed on screen, according to the WYSWYG concept. The logo data is created, however, by first reducing a multicolored image to a specific number of colors and then assigning the two or three printable colors to those remaining colors. A problem is that when dithering, for example, is used to reduce a multicolored image to a few colors, dither noise seen as a grid pattern on the screen is apparent in the reduced view of the color-reduced image, and the colors and logo that will actually be printed cannot be accurately previewed. The appearance of these stripes and grid pattern noise is attributed to the tendency for the same color to be sampled in lines or a pattern when color reduction is applied before sampling the data to reduce the image size (image reduction).

The purpose of printing logos on a POS printer, for example, is to print an image that is sharp and clear, attractive, and has a powerful impact using only a few colors. This makes it particularly important to have an accurate preview of the image that will be actually printed when creating the logo. A process for displaying a reduced version of an image after color reduction of a multicolored image has numerous potential applications, and is therefore described below using a system for producing logos to be printed on a POS printer as exemplary of one application with great practical demand. This does not mean, however, that the present invention is limited to use with POS printers, and the present invention can be widely applied in processes for displaying a scaled down preview of an image with multiple colors after applying a color reduction process in accordance with the basic principle of this invention.

The present invention is directed to resolving the problems described above, and an object of this invention is to provide a print data or logo generating method and system that makes it simple to create or change print data or a logo.

A further object of the invention is to provide a logo generating method whereby automatic size adjustment is carried out prior to any user-request image processing, while enabling these and other settings to be changed while viewing the image that will actually be printed as the logo is created.

In one aspect, the present invention involves a print data generating method, comprising identifying a width dimension of a printable medium on which the print data is to be printed, obtaining original source data, automatically resizing the source data to a predefined maximum width not greater than the width dimension of the printable medium prior to executing any user-requested changes, and displaying a first image representation of the original source data. User-requests to change the size of the original source data and to change the number of colors of the original source data may be received, and when so received, the change in size request is executed before the change in the number of colors request. Preferably, the print data generated is logo data. The displaying step is preferably performed after the automatically resizing step, and also after user-requested changes are executed.

In another aspect, the invention involves a print data generating system, comprising a parameter capture component that identifies a width dimension of a printable medium on which the print data is to be printed, a source data capture component that obtains original source data, a resizer that automatically resizes the source data to a predefined maximum width not greater than the width dimension of the printable medium prior to executing any user-requested changes, a display that displays a first image representation of the original source data, a first parameter input component that accepts a first user-request to change the size of the original source data, and a second parameter input component that accepts a second user-request to change the number of colors of the original source data. The system is further configured such that, in response to the first and second user-requests, the first user-request is executed prior to the second user-request.

In any of the aspects of the invention, the elements and functions described above may be realized using a CPU, ROM, RAM, display, input/output devices, interface, and a control program and data set stored in ROM and/or RAM. This control program and data set, as well as the data storage medium recording the control program and data set are also included within the scope of this invention. In other words, the method of the invention may be embodied in any machine-readable medium such as: electro-magnetic radiation; solid state memory; Compact Disc or other optically readable storage device such DVD or mini Disk media; a floppy disc or other removable storage medium; a hard drive disk; or a magnetic recording tape. The invention may also be embodied in any electronic product housing, or having access to, a data set and executable commands for performing the steps of a logo data generating method as described herein.

Other objects and attainments together with a fuller understanding of the invention will become apparent and appreciated by referring to the following description and claims taken in conjunction with the accompanying drawings.

BRIEF DESCRIPTION OF THE DRAWINGS

In the drawings wherein like reference symbols refer to like parts.

DESCRIPTION OF THE PREFERRED EMBODIMENTS

The present invention is described below using by way of example a printer used in a point-of-sale system (a POS printer), the type of printer that is most frequently used for logo printing, with reference to the accompanying figures. It will be noted that the following embodiments are shown by way of description only and shall not limit the scope of the invention. It will be obvious to one with ordinary skill in the related art that various alternative embodiments can be achieved by replacing some or all of the elements described below with an equivalent, and that all such variations are included in the scope of this invention.

Overview of Procedure for Storing a Logo to a Printer

Figure 2:
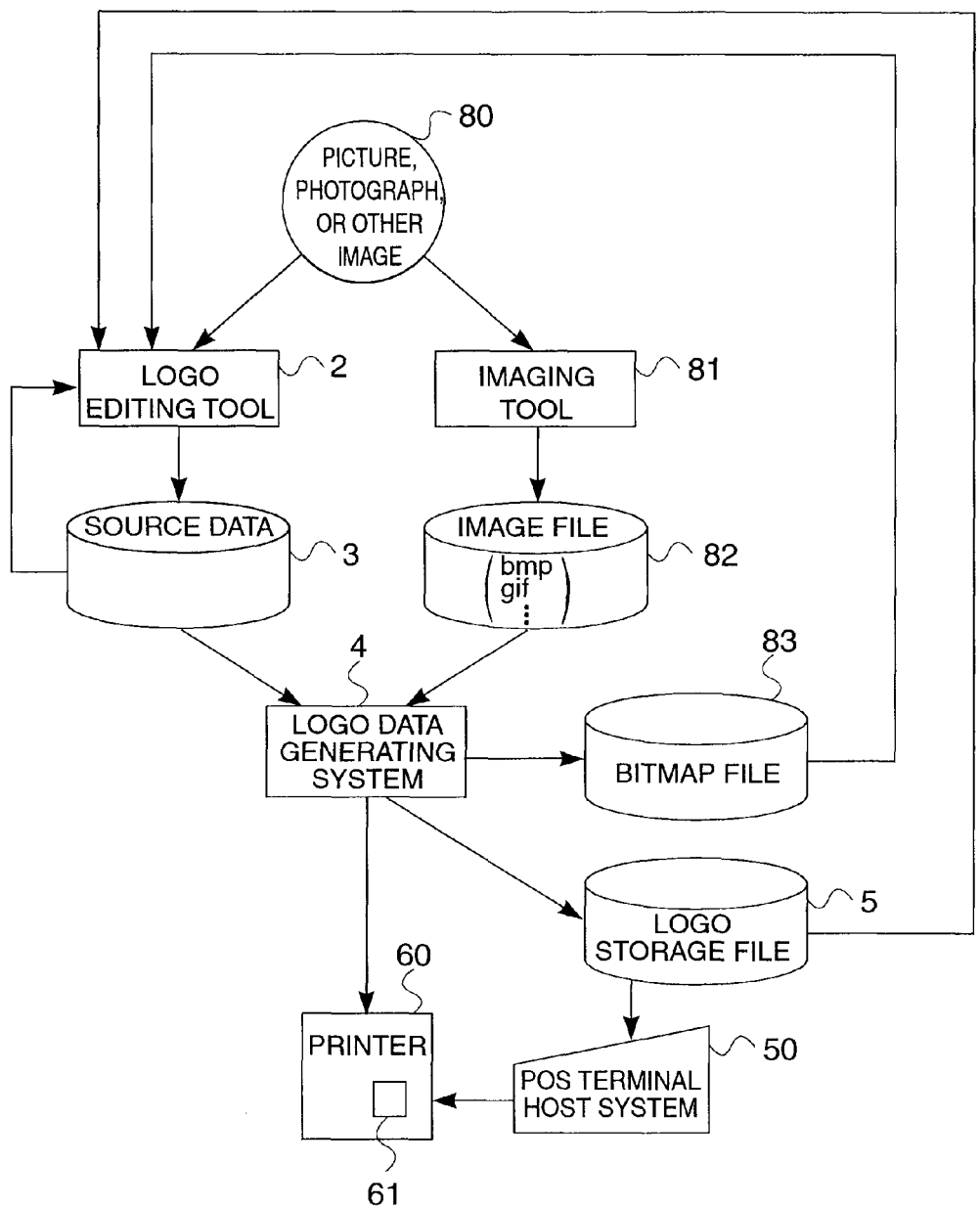
FIG. 2 schematically illustrates the process for storing a logo in a printer using a logo editing tool and logo data generating system.

A procedure according to the present invention for storing logos is described next with reference to FIG. 2. FIG. 2 shows the concept of the invention for a process including steps from creating a storage space for storing the logo in a printer.

Before the logo data can be sent to, or stored in, the printer, it must first be created. This can be accomplished by creating new logo data, to be sent or stored, by using a pre-existing image file or by reading a file containing an existing logo and re-editing the existing logo. The process for changing the source data 3 into a logo includes specifying the color reduction method and color assignments, and specifying the logo size. The source data used for creating the logo could be create anew or an existing image file could be used. The logo editing tool 2 is used when creating new source data 3 according to the logo printing objective. The logo data is often created for a particular printing purpose such as printing coupons, printing a company or store logo, or printing a product advertisement. The logo editing tool is used in such cases. Creating an actual logo using the logo editing tool involves creating the text information, capturing any pictures, photographs, or other graphic elements to be incorporated, then appropriately combining these text and graphic elements to create the desired logo, and finally matching the logo to the capabilities of a specific printer. The logo editing tool will be described in further detail below.

The situation where a file containing existing image data is used to create the logo to be stored, is described first. In this case a digital camera, scanner, or other such imaging tool 81 generates an image file 82 from a picture, photograph 80, or other image. This image file is then used as the source logo data. It is therefore not necessary to use logo editing tool 2 when using an existing image file 82. For the sake of simplicity, the source data thus created for storing in, or writing to, a printer is referred to herein as source data 3 just as if it had been created using logo editing tool 2.

The logo data generating system 4 then adjusts the colors and size of the source data according to the printable colors, print resolution, and paper width of the target printer to which the logo data will be stored. The printable colors are defined by material colors prepared for printing at the printer side. For example, if the target printer is an ink jet printer, the material colors would be the colors of the ink that is contained in the printer's ink cartridges. If the target printer is a thermal printer for printing on thermal paper, the material colors would be the heat sensitive colorants contained in the thermal paper. Also, the color of toners or ink ribbons that are prepared for a target printer would be material colors. After adjusting the source data colors (by color reduction or conversion, for example), size, and resolution, the resulting logo data (variously referred to herein as the logo, logo data, logo information, or print image data) is the data to be sent to, or stored in the printer 60.

If the printer 60 is connected to the logo data generating system 4, the logo data is sent to the printer 60 and stored in logo memory 61 (non-volatile storage) in the printer 60. If the printer 60 is not connected to logo data generating system 4, a logo data file (logo storage file 5) containing the logo data is created. The logo data file, i.e. logo storage file 5, is an image file containing embedded commands. That is, logo storage file 5 is an image file containing both the created logo data and a command data set effective for storing the created logo data. Using the logo storage file 5 according to this invention, it is not necessary to install a special logo data storage program in the host system 50 because the created logo data can be stored as a result of the host system 50 reading, i.e. executing, the command data set within logo storage file 5. The logo storage file 5 is further described in greater detail below.

Once a logo is stored in the logo memory 61 of the printer, the logo can be printed by simply issuing a print logo command.

If the printer 60 does not have a logo memory 61, the logo data can be stored in, or written to, another non-volatile memory in the host system 50, read as appropriate in accordance to an application program that is run on the host system 50, and sent to the printer 60 for printing.

Logo Editing Tool

The logo editing tool is described next below.

A logo must be created before the logo data can be stored in the printer 60. The logo editing tool 2 is used to create a new logo according to the purpose of the logo to be printed. A new logo is created by using the logo editing tool 2 to create source data 3 consisting of plural image objects, graphic objects and/or text objects that are the basis for an effective logo best suited to the particular purpose (advertisement, announcement, or other) of the logo. The logo editing tool 2 is used to capture an existing picture, photograph, or other image 80, add any text data, and incorporate other images or graphics as needed. The logo editing tool 2 also generates the data for gray scale processing. The logo data is created for a particular printing purpose such as printing coupons, printing a company or store logo, or printing a product advertisement. The source data 3 is the data from which the logo data is generated, and the basic structure of the logo is determined using the logo editing tool 2. This logo editing tool 2 can be incorporated in the logo data generating system 4 of this invention.

Generating the source data 3 using the logo editing tool 2 involves creating the text information, capturing the pictures, photographs, and other image information, and then combining the text and image (graphic) elements to create the data from which the desired logo will be generated. The logo editing tool 2 can also be configured so that the source data 3 can be produced using only text data without incorporating any images, or by drawing graphic elements. The source data 3 can also be produced by reading and re-editing logo data stored to an existing logo storage file 5 or logo data or source data 3 stored in a bitmap file 83.

Figure 3:
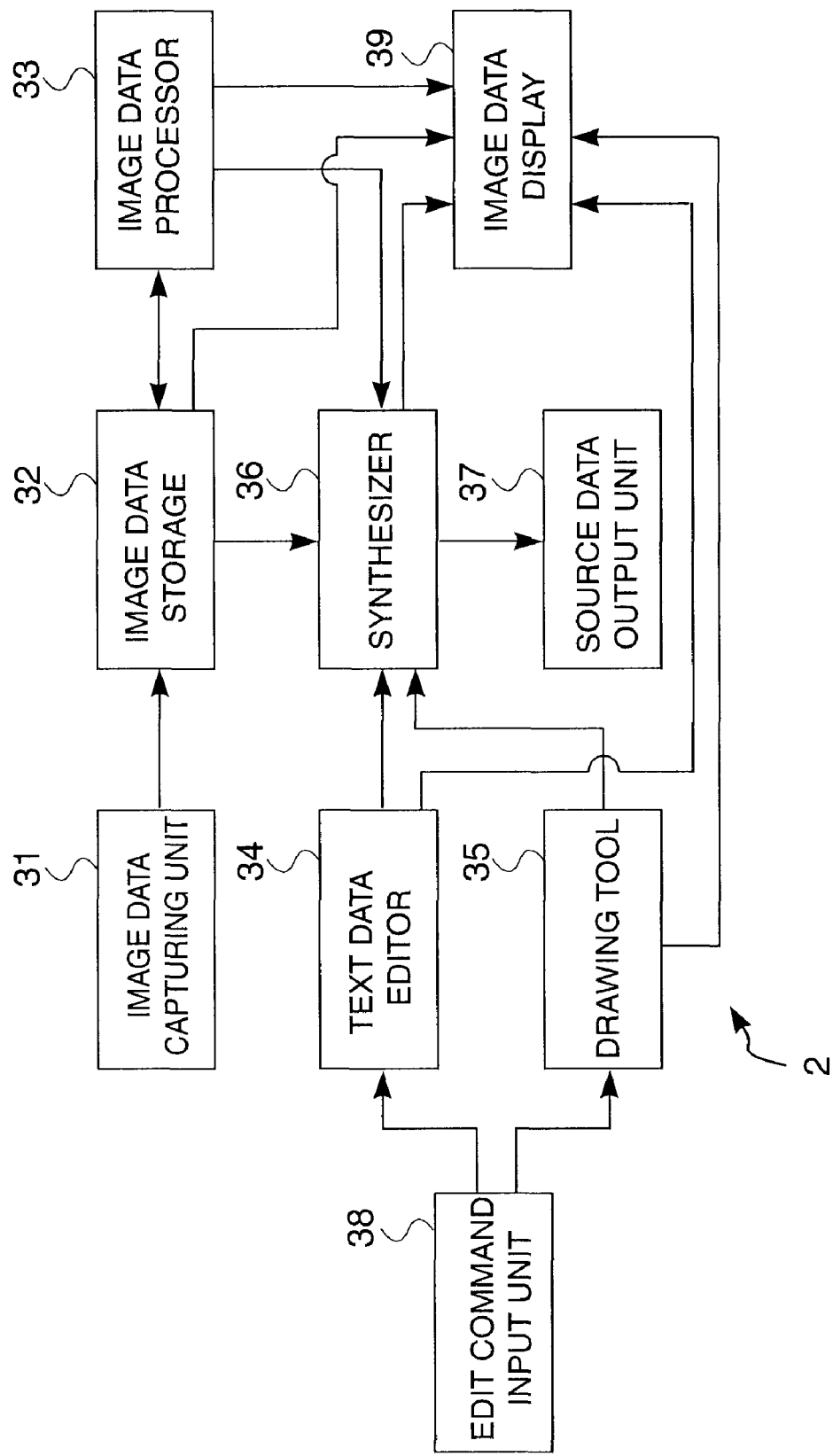
FIG. 3 is a function block diagram of a logo editing tool according to a preferred embodiment of the present invention.

The logo editing tool is described in detail next with reference to FIG. 3. FIG. 3 is a function block diagram showing a preferred embodiment of a logo editing tool 2 according to the present invention.

The logo editing tool 2 is used to create the basic configuration of an effective logo that is best suited to the printing purpose, such as an advertisement or notice. The logo editing tool 2 can be used to create the source data that is the basis for a logo incorporating image data and text data, send the resulting logo data to the logo data generating system 4 (FIG. 2), and save the logo data as a source data file 3.

The logo editing tool 2 includes an image data capturing unit 31, image data storage 32, image data processor 33, text data editor 34, drawing tool 35, synthesizer 36, source data output unit 37, edit command input unit 38, and image data display 39.

The image data capturing unit 31 reads and stores the image data, or graphics data to be used in the logo to the image data storage 32. Plural image or graphic data elements can be read and stored. The image or graphic data can be stored to the image data storage 32 by reading a graphic or image file from magnetic disc, CD-ROM, or other storage medium, or by capturing an image from a digital camera, scanner, or other such means.

The graphic or image data stored to the image data storage 32 could include photographic images, animated graphics, geometric patterns, decorative letters, and various types of graphics. Multiple graphics or images can be stored separately to the image data storage 32. The image data capturing unit 31 is preferably compatible with various image file formats and software programs so that as many different types of image files as possible can be read and used. The read image data can be stored as individual objects or image data files to the image data storage 32.

The image data processor 33 in the logo editing tool 2 processes the image data stored to image data storage 32 to adjust the image size and other parameters as necessary. Text data can be created and edited by the text data editor 34 based on input from the edit command input unit 38. The color of the text can also be specified. By making the text data editable, textual information appropriate to the advertisement or notice can be included when the logo is edited. By providing a drawing tool 35, the logo editing tool 2 can also be configured so that graphic elements can be composed inside the logo editing tool 2 based on input from the edit command input unit 38, which is typically includes a keyboard and mouse or other input device.

The captured image information, image-processed image information, and graphic and/or text elements created in the logo editing tool 2 are then merged by the synthesizer 36 to create the desired logo. The synthesizer 36 combines multiple image data, image, graphic, or text data objects to produce the desired source data. When the multiple image data, image, graphic, or text data objects are combined, the user can operate, for example, which image, graphic and text objects are selected, and the size and position of the image and text objects relative to the overall size and configuration of the logo. The source data is synthesized by the synthesizer 36 as a combination of independent image or text objects, and output by the source data output unit 37.

It is therefore possible to read multiple images stored to image data storage 32, and then freely layer and combine the read images as independently editable objects. It is also possible to layer objects created with the text data editor 34 and/or drawing tool 35, and objects stored to the image data storage 32. The image data processor 33 and synthesizer 36 can then separately process the layered objects. When objects overlap, it is also possible to specify and change how the objects blend and which object is displayed in front. It is also possible to specify and change the size of the individual objects.

The image data display 39 can display the read images, images stored to the image data storage 32, and the data output from the image data processor 33, synthesizer 36, text data editor 34, and drawing tool 35.

The source data output unit 37 can send the source data directly to the logo data generating system, or output the source data as a source logo data file. The synthesizer 36 merges the source data so that the images combined in the source data can later be image processed and manipulated as separate image objects. When the source data is output as a file, it is preferably output as a metafile, that is, a file in which the elements therein can be manipulated independently.

It should be noted that while the image data processor 33 and synthesizer 36 are shown as separate function blocks in FIG. 3, the image processing capabilities of the image data processor 33 can be incorporated in the synthesizer 36 so that the sizes of the images can be changed as needed when the objects are merged.

The image data obtained by the logo editing tool 2 in this example is not color processed by color reduction, for example, but the logo editing tool 2 can be configured so that if a full color picture, photograph, or other image 80 is obtained the colors will be reduced to a specified number of colors and then stored as the logo source data.

Logo Data Generating System

The source data 3 produced with the logo editing tool 2 is then changed by the logo data generating system 4 to the final logo data format enabling the data to be stored to a specific printer.

It should be noted that the source data obtainable by the logo data generating system 4 is not limited to the source data 3 output from the logo editing tool 2 and includes image files 82 created by other image processing programs. Both source data 3 and image file 82 are therefore referred to herein as source data.

As described above, color POS printers are primarily limited to printing two or three material colors. If the source data image is a full-color image or graphic data containing many different colors (brightness, color, and hue), the colors of the source image must be reduced to the colors that can actually be printed by the POS printer. Furthermore, even though the printer can only print a few colors, it is still possible to print subtle shades instead of just two simple colors. If, for example, the printer can print the two colors black and red, shades of black and red can be expressed using dithering, for example, if each pixel unit consists of multiple dots. Even more subtle colors, detail, and complex color expressions ("tones" below) are possible using a combination of red, black, and white (the color of the paper). Even more complex, subtle printing is possible if three or more colors can be used. It is therefore necessary to define what color or shade should be used for what color in the source data, a process referred to herein as converting or assigning colors. The logo data generating system 4 specifies the color reduction applied to the source data and assigns the printable colors to determine the colors of the final logo. In other words, the logo data generating system 4 converts the reduced colors in source data to the printable colors.

It is also necessary to adjust the size of the logo to the paper that will be used because different printers use different widths of paper to print receipts. The size of the printed logo will also vary according to the resolution of the printer, and the size of the logo must therefore also be adjusted according to the printer resolution.

The logo data generating system 4 is a system for completing the logo in a form that can be printed by the target printer by, for example, adjusting the final image of the desired logo or adjusting the image by defining the width of the paper used by the target printer to which the logo data will be stored, specifying the color assignments or conversions according to the printable colors, and specifying the vertical and horizontal print resolutions. The logo data generating system 4 can also set the connection port, communication speed, parity check, flow control method, and other parameters for communicating with the target printer.

The logo data generating system 4 reads an existing image file 82 or source data 3 produced by the logo editing tool 2, converts the image according to the specifications of the target printer that will store the logo through an image adjustment process, and thus creates the logo data for storing a logo in the non-volatile memory of the target printer (storing the logo in the printer is also referred to as registering the logo in the printer). The resulting logo data can also be output as a logo storage file in a specific format.

First Embodiment of a Logo Data Generating System

Figure 1:
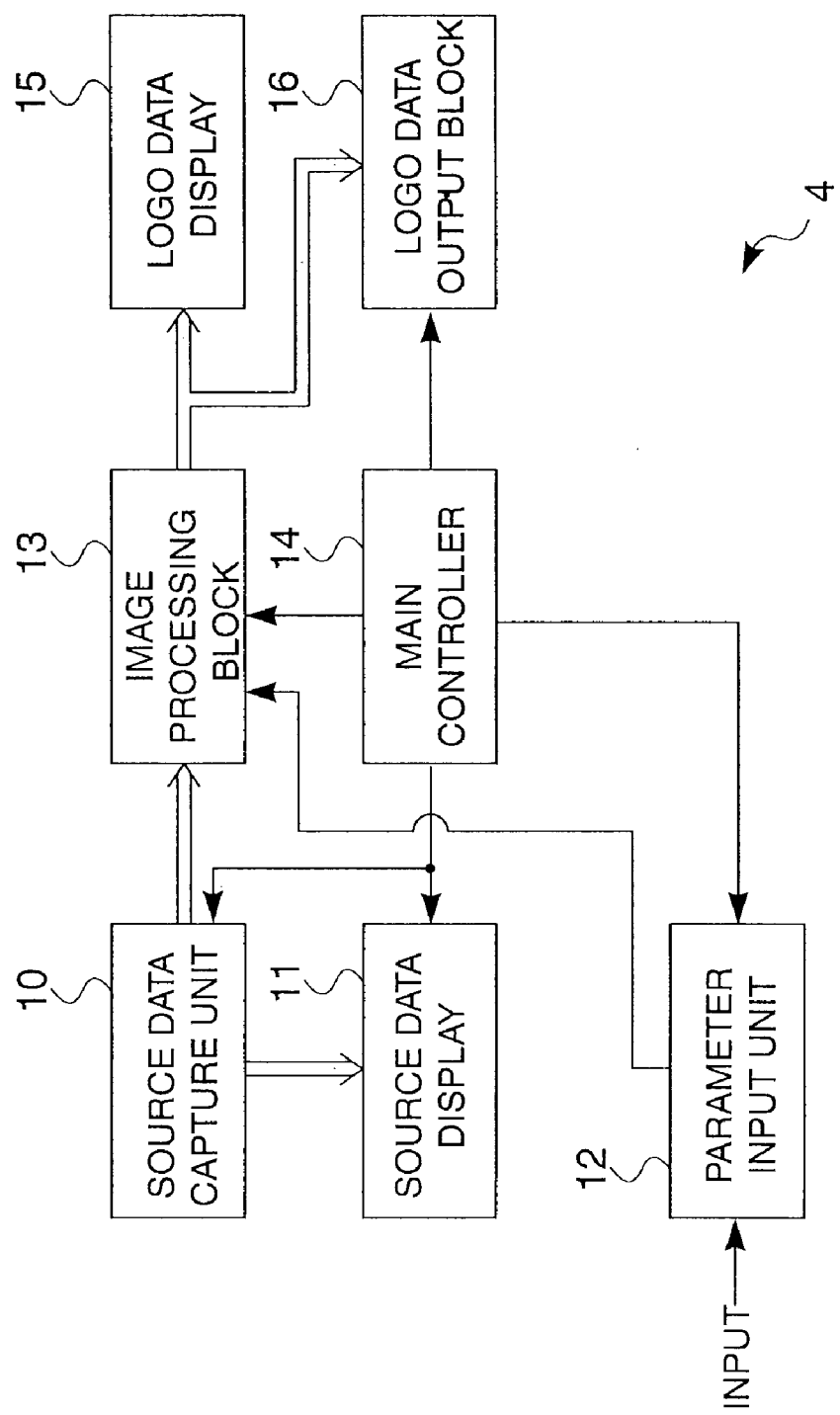
FIG. 1 is a function block diagram of a logo data generating system according to a preferred embodiment of the present invention.

A first preferred embodiment of a logo data generating system 4 according to the present invention is described next with reference to FIG. 1. FIG. 1 is a function block diagram of a logo data generating system 4 according to this first embodiment.

A logo data generating system 4 according to this first embodiment has a source data capture unit 10, source data display 11, parameter input unit 12, image processing block 13, logo data display 15, logo data output block 16, and a main controller 14 for controlling them and the other parts.

The source data capture unit 10 gets the source data 3 from the logo editing tool 2 (FIG. 2) or normal image file 82 as controlled by the main controller 14. The source data is then stored in the source data capture unit 10. The source data capture unit 10 reads different types of files using a file reader (not shown in the figure) or image capturing means (not shown in the figure), or can directly capture the source data. What types of files can be read an be controlled as desired. More specifically, the source data capture unit 10 can be a magnetic storage reader (such as a floppy disk drive or hard disk drive), CD-ROM drive, CD-RW drive, DVD drive, scanner, or other type of reading device. Alternatively, the image may be conveyed in electro-magnetic transmission, such as through a radio or infrared wireless communication.

Once the source data is stored in the source data capture unit 10, the main controller 14 controls the parameter input unit 12 so that various image processing parameters for adjusting the image can be input. This enables the user to input the name, printable colors, resolution, gradations, and other parameters according to the specific printer. The main controller 14 also controls the source data display 11 at the same time to display the source data image on screen at the same time.

This enables the user to see the source data image and set the parameters while seeing the result of the selected color reduction method and conversion of source data colors to printable colors, for example, at the same time.

After the parameters are set, the settings are sent to the image processing block 13, which then adjusts the colors, resolution, size, and other aspects of the source data 3 according to the input settings. If the image stays the same size but is printed on a lower resolution printer, the printed image will be larger. Therefore, if it is desirable to keep the size of the print image the same size as the source data image, or if the print image will be wider than the paper width because the printer resolution is low, a process for reducing the size of the print image is needed. More specifically, the size of the logo registered in the printer is determined by adjusting the size of the source data according to both the width of the printing paper and the printer resolution. The adjusted source data 3 is then presented on the logo data display 15 as the image after these changes are made. The user can therefore confirm what the print image resulting from the set parameters will be like. The image adjustment parameters can also be changed while looking at the processed image. If no parameter changes are required and the settings are confirmed, the main controller 14 controls sending the processed logo data to the logo data output block 16.

As controlled by the main controller 14, the logo data output block 16 then stores the logo data, outputs it as a logo storage file configured to permit the later transfer of the logo to the printer, or sends, i.e. stores, the logo data directly to the printer. The logo data output block 16 can also output the logo data adjusted to the target printer specifications as described above as a monochrome or color bitmap image file. Files produced by the logo data generating system 4 can thus be stored in the logo editing tool or to an external data storage medium (such as a magnetic storage medium; not shown in the figure).

Note that specifying the color assignments or conversions and image processing parameters is described more specifically below using flow charts and sample display screens.

Image Processing Block of the Logo Data Generating System

Figure 25:
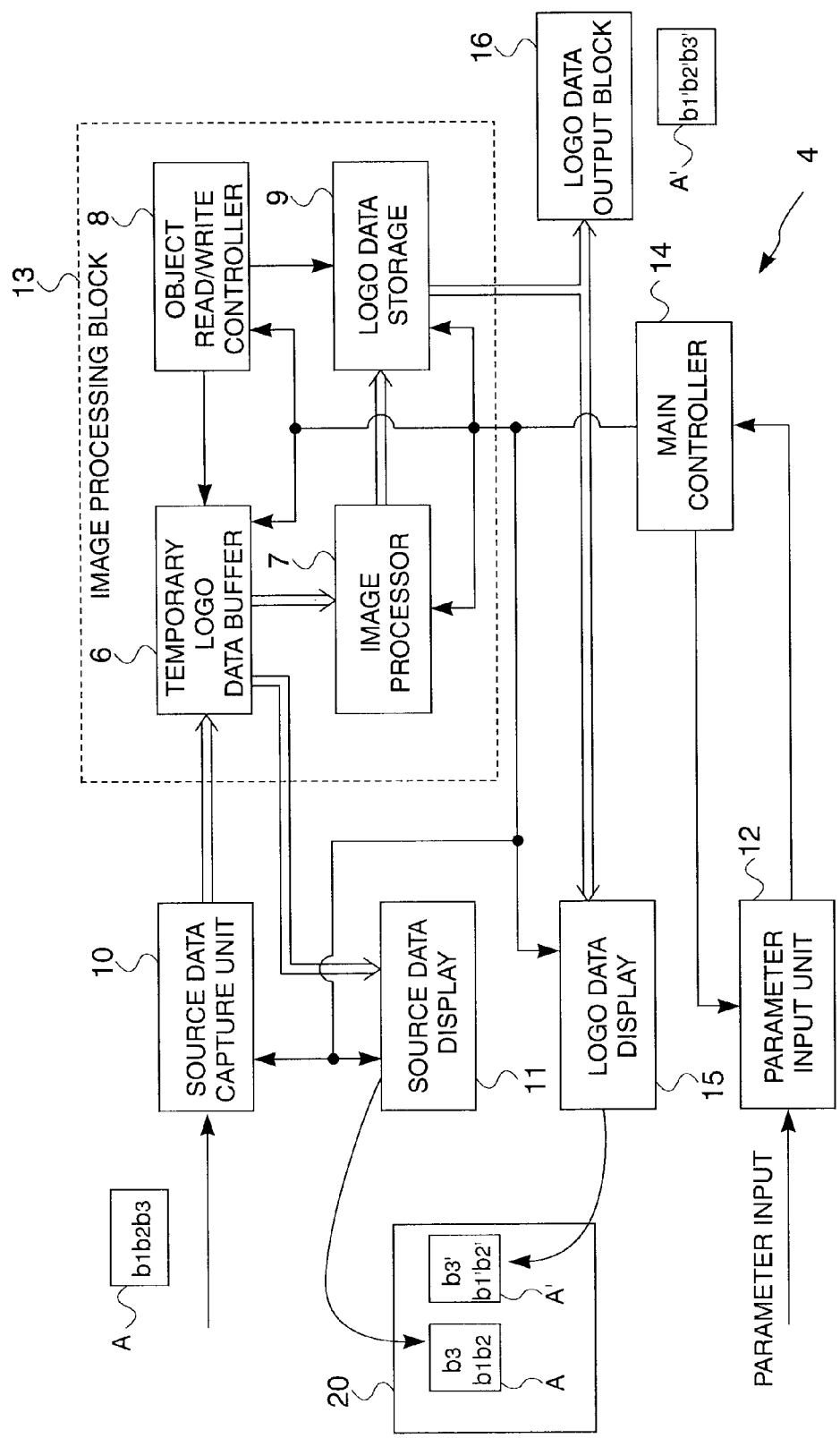
FIG. 25 is a detailed function block diagram showing a image processing block used in a logo data generating system according to the present invention.

FIG. 25 is a function block diagram showing some internal functional blocks of the image processing block 13 of FIG. 1 as implemented in the logo data generating system 4 of FIG. 2 according to this embodiment of the invention.

As shown in FIG. 25, the image processing block 13 includes a temporary logo data buffer 6, image processor 7, object read/write controller 8, and logo data storage 9. Reference letter "A" in FIG. 25 represents an image of source data 3, and reference numerals "b1", "b2", "b3" represent the objects in the source data. Reference letter "A'" represents the logo image after image processing, and reference numerals "b1'", "b2'", "b3'" represent the objects in the processed image A'.

The image processing block 13 is described below with particular reference to processing the objects in the source data.

Based on the file selection input from parameter input unit 12, main controller 14 controls the reading of source data "A" by source data capture unit 10 from the indicated file. Source data "A" is then stored in the source data capture unit 10.

The main controller 14 also sends source data "A" to logo data output block 16, and controls image processing block 13 and parameter input unit 12 so that the user can input the parameter settings for image adjustment. The user is thus able to input the name, printable colors, resolution, gradations, and other parameters for the printer. The main controller 14 also controls the source data display 11 to display an image of source data "A" to a display screen 20. The source data "A" is passed through the image processor 7 and stored to logo data storage 9. If the image processing parameters are set, the source data "A" is first processed accordingly and then stored to logo data storage 9 as processed image A'. If no parameters are set, source data "A" is processed using the printable colors, print resolution, gradation, and image process initially set in the parameter input unit 12, and then stored to the logo data storage 9 as processed image A'. The logo data A' stored to the logo data storage 9 is also displayed on the display screen 20 by the logo data display 15.

The operator can thus view the results of the selected color reduction method, color assignments, and other image processing parameters while also looking at an image of the source data "A", and make adjustments as necessary.

When an object is selected using the parameter input unit 12, main controller 14 controls object read/write controller 8 to read the selected object from temporary logo data buffer 6 and send it to image processor 7. The image processor 7 then processes the image according to the set parameters, and stores it in logo data storage 9. The data stored in logo data storage 9 is also displayed by logo data display 15.

Figure 26:
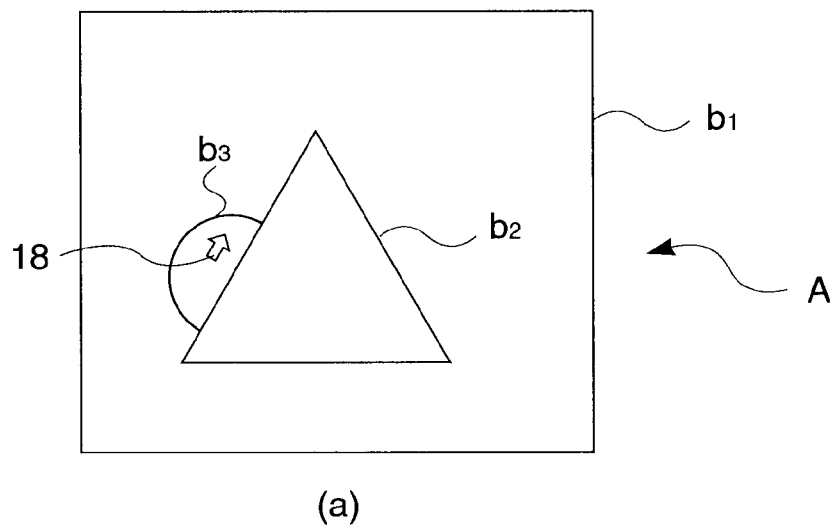
FIG. 26 shows displaying image objects on screen.
Figure 26:
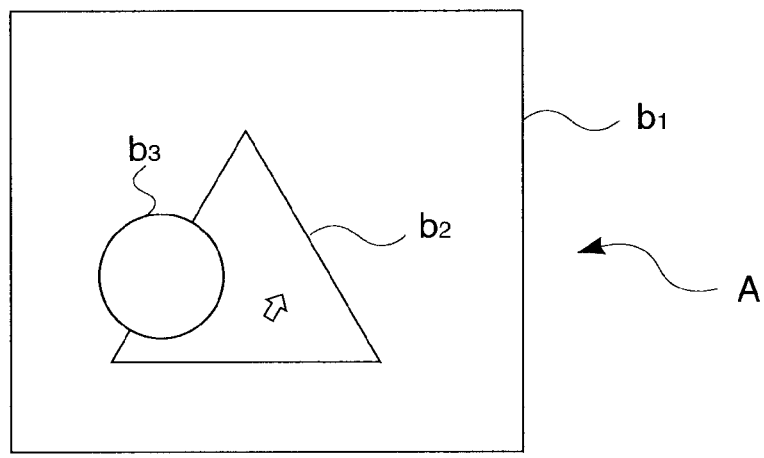

This process is further described with reference to FIG. 26 when object "b3", for example, is selected. Parts (a) and (b) of FIG. 26 show an example of images presented on display screen 20. Part (a) of FIG. 26 shows the configuration of source data "A". In this example source data "A" consists of a square object "b1", a triangle object "b2", and a circle object "b3" arranged as shown in part (a) of FIG. 26. To edit circle object "b3", the user uses a curser 18, represented by an arrow, to point to and click on circle object "b3", preferably by corresponding movement with a computer periphery mouse, for example. This causes object read/write controller 8 shown in FIG. 25 to read circle object "b3" from temporary logo data buffer 6 and send it to image processor 7. This enables circle object "b3" to be processed. The display also changes, as shown in part (b) of FIG. 26, so that circle object "b3" is in front of triangle object b2 and square object b1. To edit the triangle object b2, the user simply clicks on the triangle object b1 in a similar manner as explained in reference to circle object b3.

In this example the object to be edited is brought to the front of the display for processing, but it is also possible to display only the selected object. It is also possible to select multiple objects in a batch process of the objects at the same time.

The process after the parameters are set by the parameter input unit 12 is described below. Note that this next process applies both to processing only the selected objects and to overall image processing of the source data 3 (FIG. 2). It is also possible to simultaneously select multiple objects and simultaneously process all selected objects.

Gray Scale Processing Block

Figure 27:
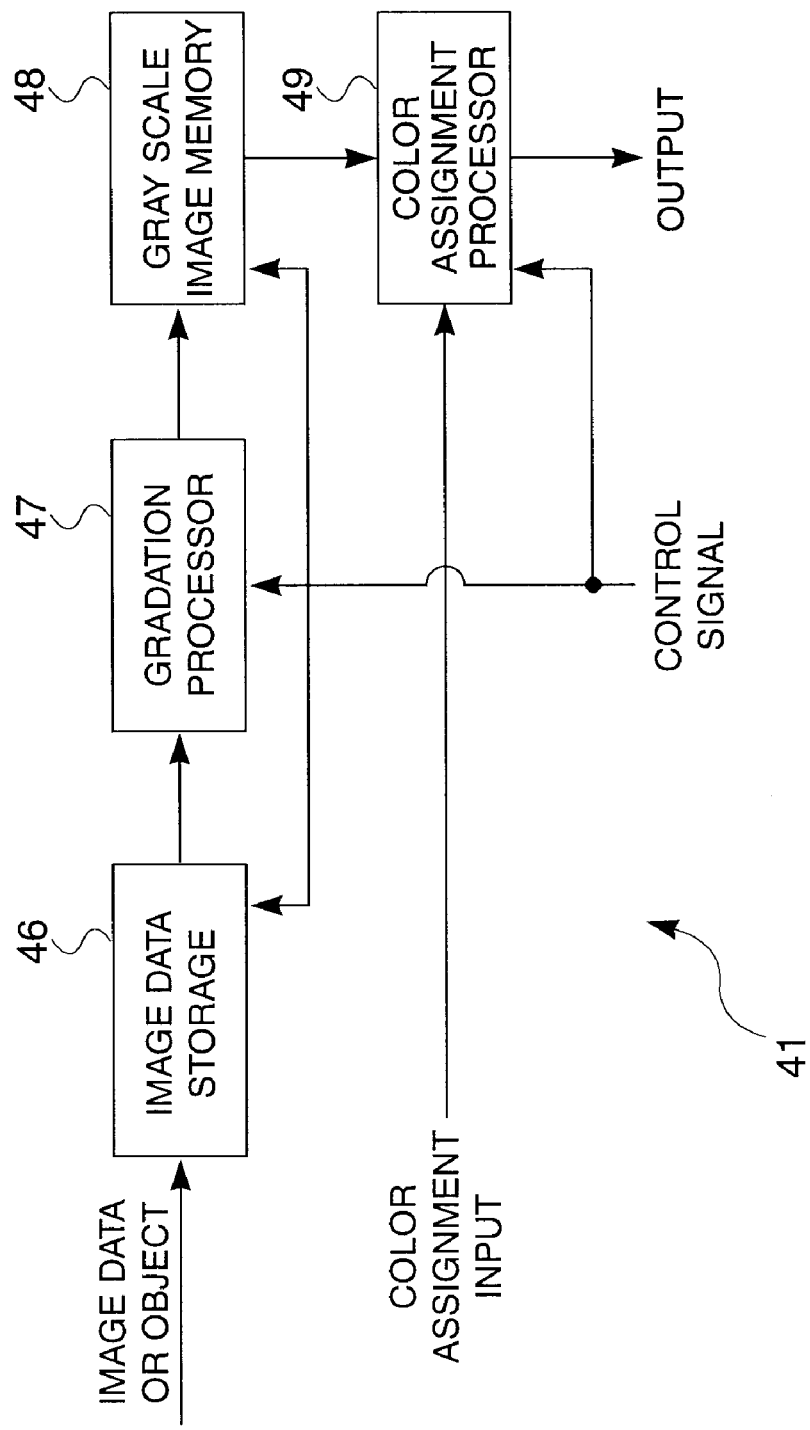
FIG. 27 is a function block diagram of a preferred embodiment of a gray scale processing block used in a logo data generating system according to the present invention.

The image processing part of the logo data generating system 4 according to the present invention is described next with reference to FIG. 27. FIG. 27 is a function block diagram of a preferred embodiment of a gray scale processing block used in the logo data generating system 4 of this invention. For the sake of clarity, the gray scale processing block 41 shown in FIG. 27 shows only the basic parts of the gray scale process.

Based on a control signal from the main controller 14, shown in FIG. 1, image data storage 46 reads and stores the source data image or objects of the source data image. After the source data is stored, a control signal causes the gradation processor 47 to convert the image data to gray scale data. This gray scale conversion process converts color graphic information to monochrome graphic data with no color, similar to a black and white photograph. Color graphics usually contain hue, color, and brightness data, but gray scale data only contains brightness information. This results in color images expressed with brightness difference (gradation) information only. 24 bit color image data can be converted to a 256-level gray scale image, which is expressed using one byte (eight bits) of brightness data per pixel. The resulting gray scale data is then stored in gray scale image memory 48.

If the colors assignments have already been input when the source data is converted to gray scale data, the color assignment processor 49 assigns the specified colors. That is, the gray scale data is correlated to the assigned colors. If there is no color assignment, a default color such as black or a preselected material color, or the color assignments used in the most recent process, is used.

The gray scale processing block 41 shown in FIG. 27 can exist as a part of the image processor 7 shown in FIG. 25. Alternatively, the functionality of image data storage 46 shown in FIG. 27 can be provided in the temporary logo data buffer 6 in FIG. 25, in which case the image data storage 46 of FIG. 27 can be omitted from the description of gray scale processing block 41. The gray scale processing block 41 shown in FIG. 27 is also just one possible configuration, and other gray scale converters can also be used in the present invention.

Basic Concept of the Reduced Image Display

Figure 28:
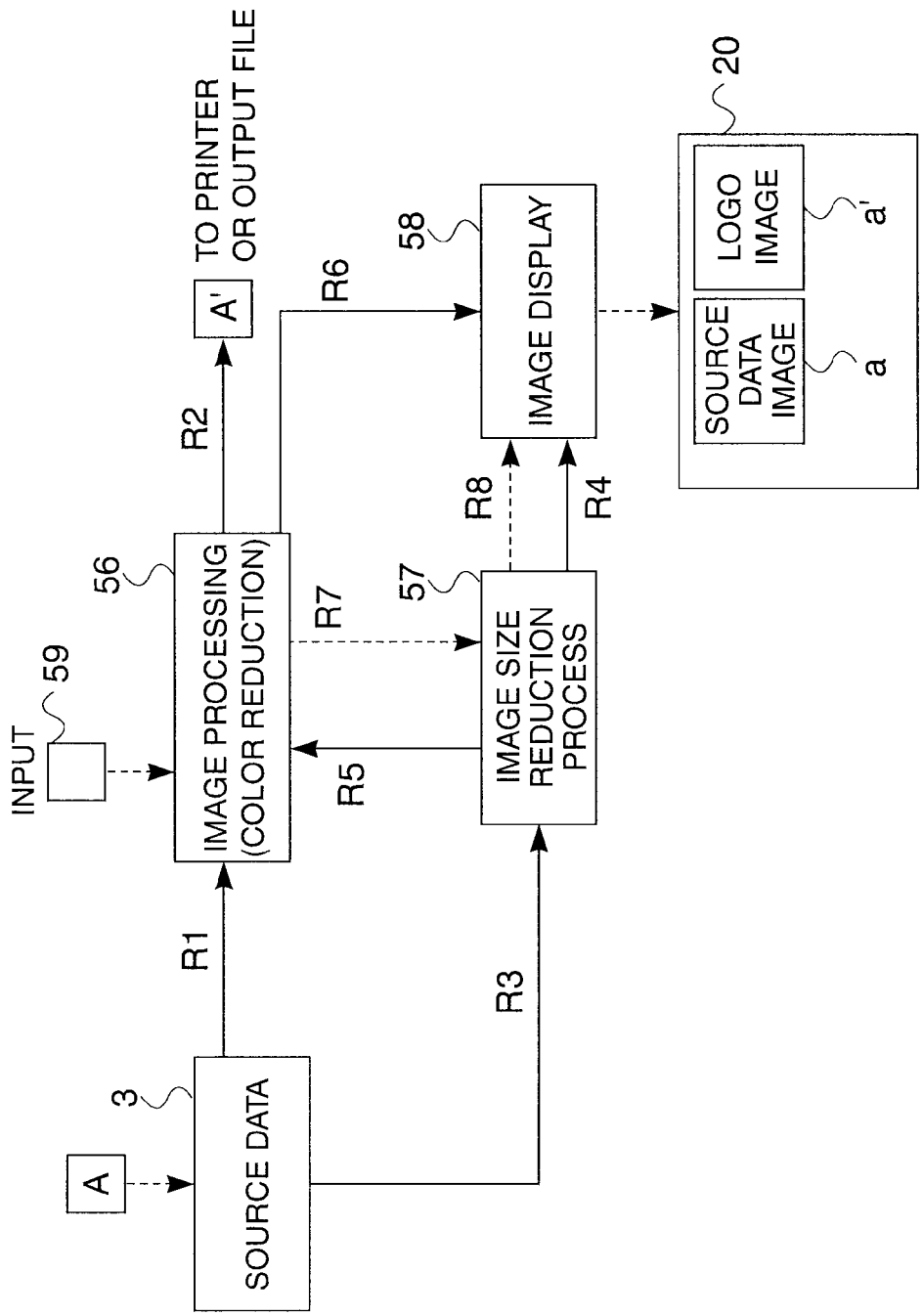
FIG. 28 illustrates the concept of a reduced image display in a logo data generating system according to the second and third embodiments of the present invention.

FIG. 28 shows an example of a reduced image display in second and third embodiments of the logo data generating system further described below.

The reduced display process of the present invention after the color reduction process is the image process indicated by routing paths R1 and R2 in FIG. 28. Color reduction process 56 is applied to the source data 3 of the multicolored image "A" to be processed according to the input settings from input 59. The processed image "A" can be printed on the printer, stored as a logo in the printer, or output to a file.

When the user inputs the settings for the color reduction process 56, and it is applied to the source data 3, the image "a" representation of data A of the source data 3 and the image "a'" representation of the data A' after image processing, are preferably displayed for confirmation. Yet further preferably, both images "a" and "a'" are reduced and displayed together on display screen 20 so that the two images can be compared at the same time on the same screen.

When the image is reduced by size reduction process 57 after the color reduction process 56, namely, if displaying image "a'" as a reduced version of data A' after processing as indicated by routing paths R1, R7, and R8, a dither pattern noise appears as described above and the processed image cannot be correctly displayed.

This invention displays an image "a" of data A of source data 3 routed as shown along routing paths R3 and R4 in FIG. 28. This is because color reduction process 56 is not applied among these routing steps. The procedure for displaying an image "a'" of the processed source data differs from that of displaying image "a". That is, the present invention uses routing paths R3, R5, and R6 to display a reduced preview image "a'" of the source data A' after it is processed. More specifically, the size reduction process 57 is applied to the image before color reduction process 56, thereby preventing the data sampling step of the size reduction process 57 from producing a dither pattern noise from same-color areas. Note that the color reduction for the reduced image "a'" through the routing paths R5 and R6 is processed by using the same input settings as the color reduction process for forming the processed image "A'" through rout paths R1 and R2.

The reduced image presented by the present invention is not really a reduced preview of the processed image. However, the image presented by this process presents a sharper, clearer image of the processed data than does a reduced image obtained by applying the size reduction to the image after the color reduction. The purpose of a preview is to easily confirm an image when viewing the actual image is difficult or time-consuming. It is therefore important to accurately and clearly represent the actual image, and the process whereby the preview image is created is not important. The present invention therefore reduces the image for previewing before applying color reduction, and thereby displays a clearer preview image.

Second Embodiment of a Logo Data Generating System

Figure 4:
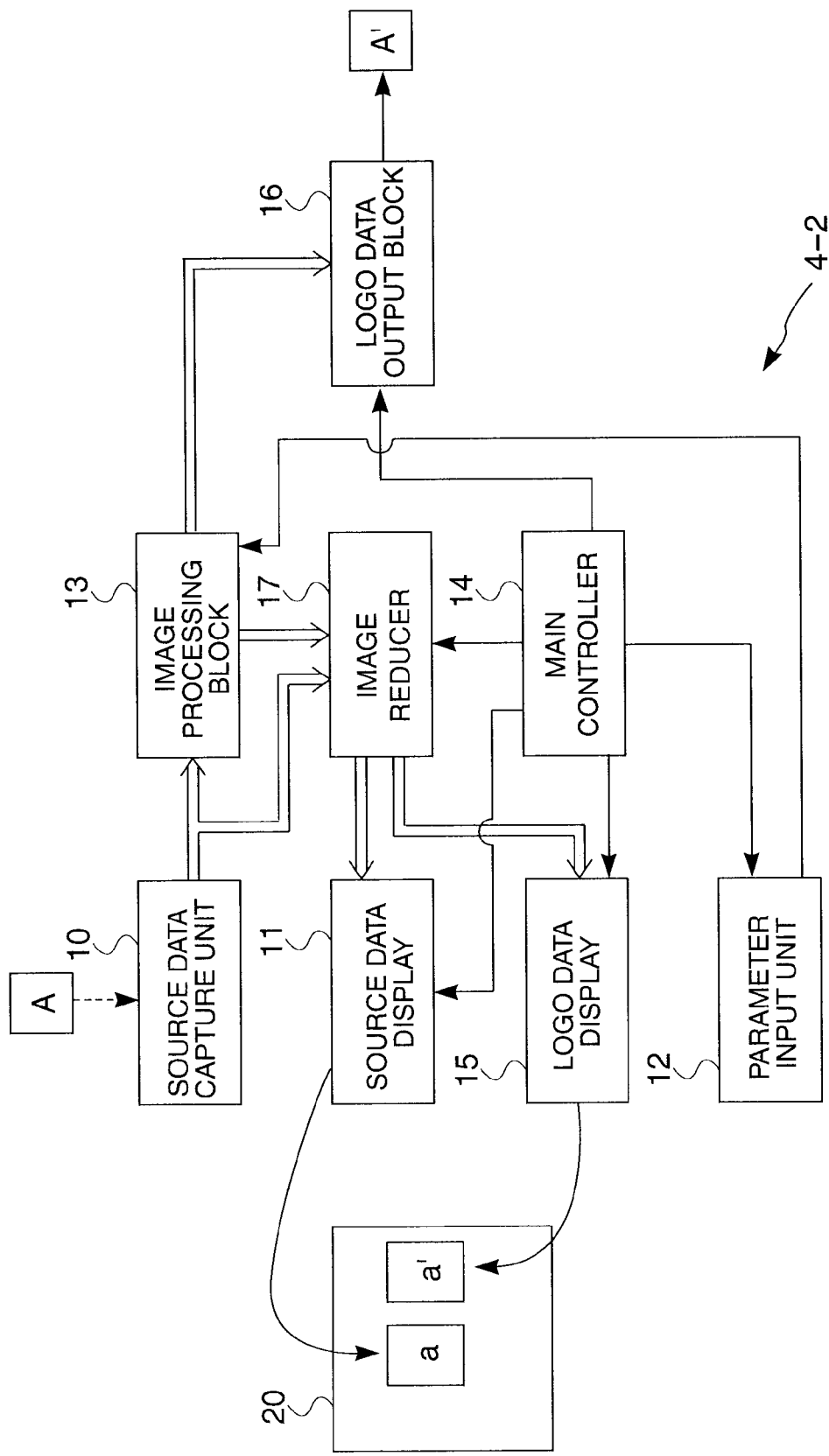
FIG. 4 is a function block diagram of a logo data generating system according to a second embodiment of the present invention.

A second embodiment of the present invention is described next with reference to FIG. 4. FIG. 4 is a function block diagram of a logo data generating system 4-2 according to this second embodiment.

This embodiment differs from the first embodiment in having an image size reducer 17 to reduce the images and then display a reduced image "a" of the source data and the logo data image "a'" after image processing. This enables even more efficient image processing because an image "a" of the source data and an image "a'" of the logo after changes are made can be simultaneously displayed on display screen 20.

Third Embodiment of a Logo Data Generating System

Figure 5:
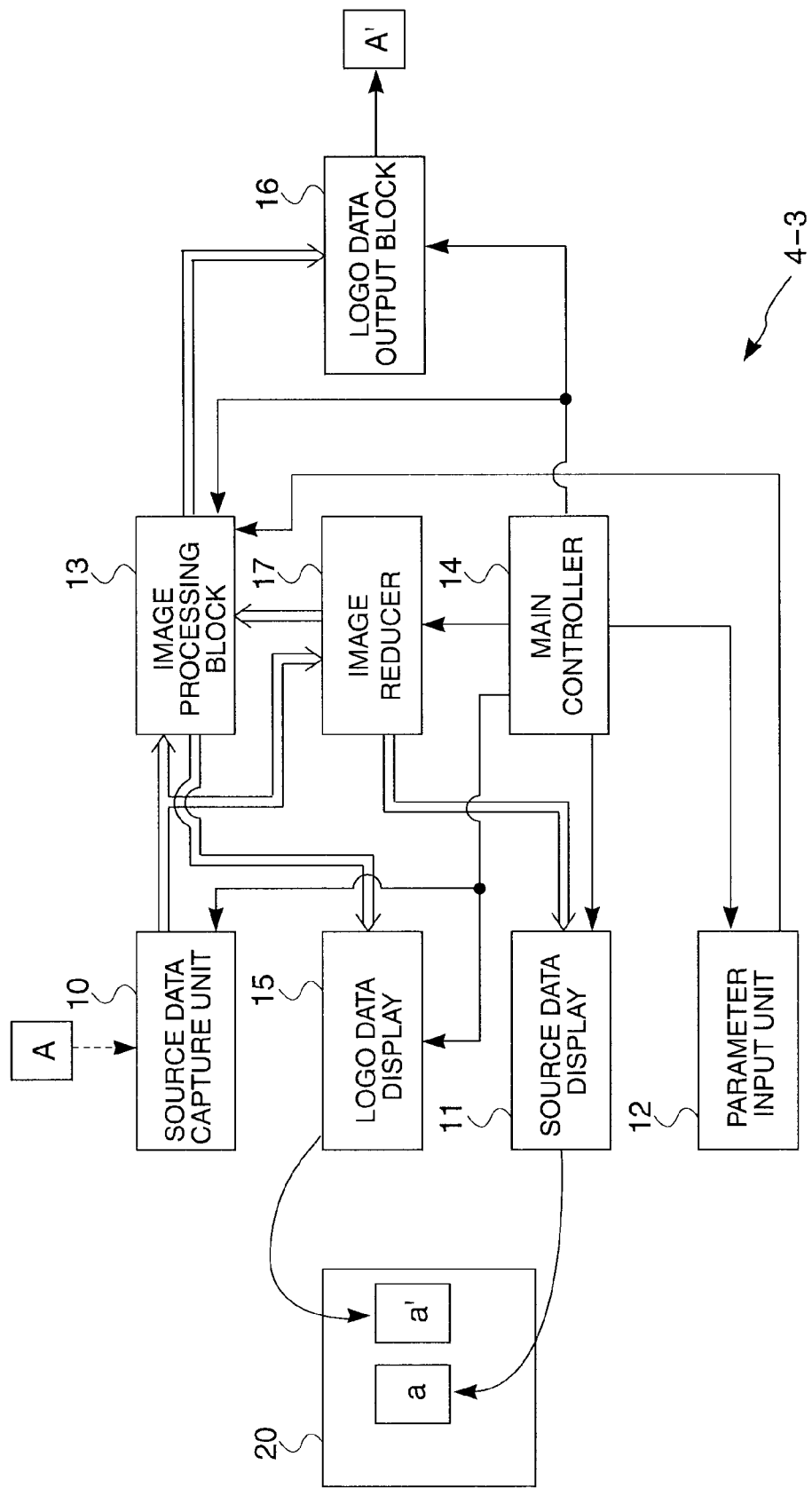
FIG. 5 is a function block diagram of a logo data generating system according to a third embodiment of the present invention.

FIG. 5 is a function block diagram of a logo data generating system 4-3 according to a third embodiment of the invention. This embodiment differs from the second embodiment in that when displaying a reduced image "a" of the logo data or a logo data object, the source data "A" is first sent to the image size reducer 17 and reduced to produce reduced image "a", and the color data is then reduced by the image processing block 13 to produce and display reduced image "a'". By configuring the system to first reduce the image and then apply color reduction, the dithering noise and striping that appear when the image is reduced after color reduction can be prevented, and a preview even closer to the actual printed image can be displayed.

Creating a Logo Storage File Using the Logo Data Output Block

As described above, the logo data output block 16 shown in FIG. 1, FIG. 4, FIG. 5, and FIG. 25 can send data directly to a printer to be stored therein, create a bitmap logo data file, or create a logo storage file 5 (FIG. 2) for storing the logo data. This logo storage file 5 contains both the logo data and a set of commands needed to store the logo data. When the POS terminal host reads this logo storage file 5, the logo data can be stored directly from the logo storage file 5 without installing a special program. The host simply sends the storage command in the read logo storage file 5 to the printer to complete logo registration.

Figure 6:
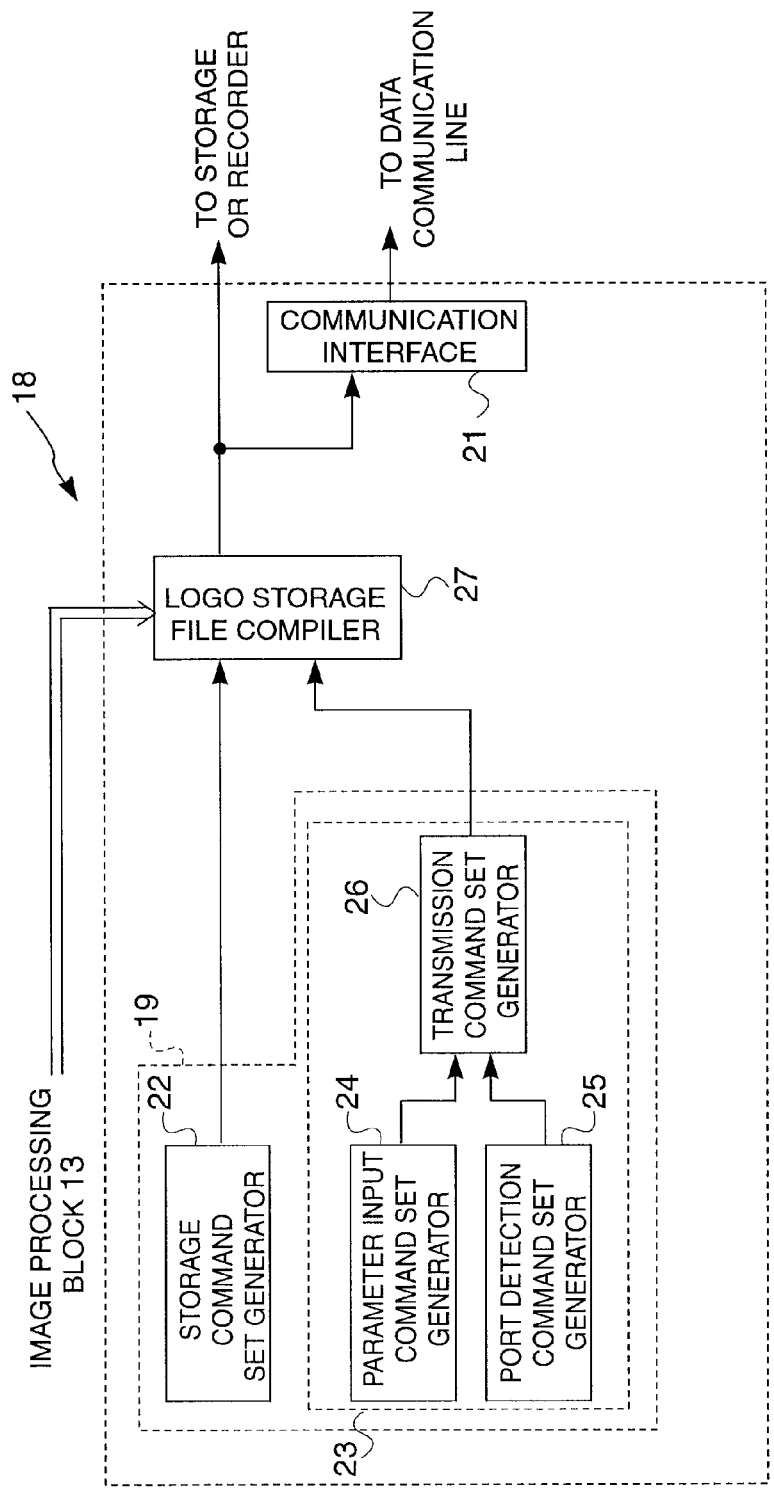
FIG. 6 is a function block diagram of a logo storage file output unit 18 according to a preferred embodiment of a logo data output block 16 for generating a logo storage file.

FIG. 6 is a function block diagram of the logo storage file output unit 18 in a preferred embodiment of the logo data output block 16 for generating this logo storage file 5. Note that FIG. 6 shows only the major components of interest, and components not particularly to logo file creation are omitted.

The logo storage file output unit 18 has a command data set generator 19, logo storage file compiler 27, and communication interface 21. The logo storage file output unit 18 receives and stores the logo data from the image processing block 13. The command data set generator 19 creates the set of commands needed to store the logo output from image processing block 13 in the printer. The command data set generator 19 has a storage command set generator 22 and data transmission command set generator 23. The storage command set contains executable commands sent to the printer so that the target printer stores the received logo data.

The data transmission command set generator 23 has a parameter input command set generator 24, port detection command set generator 25, and transmission command set generator 26. The parameter input command set generator 24 produces an executable command set enabling the user to input communication parameters such as the communication port. The port detection command set generator 25 produces a set of commands executed to detect the communication port to which the target printer is connected. The transmission command set generator 26 produces a set of commands for sending the storage command set and logo data to the target printer.

The logo storage file compiler 27 (called the file compiler 27 below) combines the logo data (print image data), storage command set, and data transmission command set to produce logo storage file 5 (FIG. 2). This logo storage file is preferably a single file, but can be a linked set of files. Whether the storage command set is generated, whether the parameter input command set is generated, and whether the port detection command set is generated can be selected using a controller (not shown in the figure).

The logo storage file output by the logo storage file compiler 27 can be sent to the host of a POS terminal to which the target printer is connected if the host is connected to the communication interface 21 via a communication line. The logo storage file can also be written from the logo storage file compiler 27 to internal memory or non-volatile (NV) memory (not shown in the figure), or can be output through an input/output interface (not shown in the figure) to floppy disk, hard disk, memory card, or other external storage device (not shown in the figure). By causing the POS terminal host to read the logo storage file stored in a floppy disk or other medium, or the logo storage file sent to the POS terminal via the communication link, the host reads the command sets stored in the logo storage file and can store the logo data in the printer without installing a separate special logo registration program in the host.

The logo editing tool 2 and logo data generating system 4 are described as separate configurations above, but it will be obvious that the logo editing tool 2 can be built into the logo data generating system 4, creating a logo data generating system having an integral logo editing function.

It will be obvious to one with ordinary skill in the related art that the logo editing tool and logo data generating system described above can be achieved using a microprocessor (CPU), ROM and RAM connected via a bus to the CPU, and an operating system (OS) and other appropriate control programs stored in the ROM and RAM. The CPU, ROM, and RAM, and the control programs stored in the ROM and RAM cooperate to function as the various function units or blocks. The various parts of the logo editing tool 2 and logo data generating system 4 are thus achieved by integrally linking the various input devices, control programs, CPU, and storage devices.

Logo Editing Process

Figure 7:
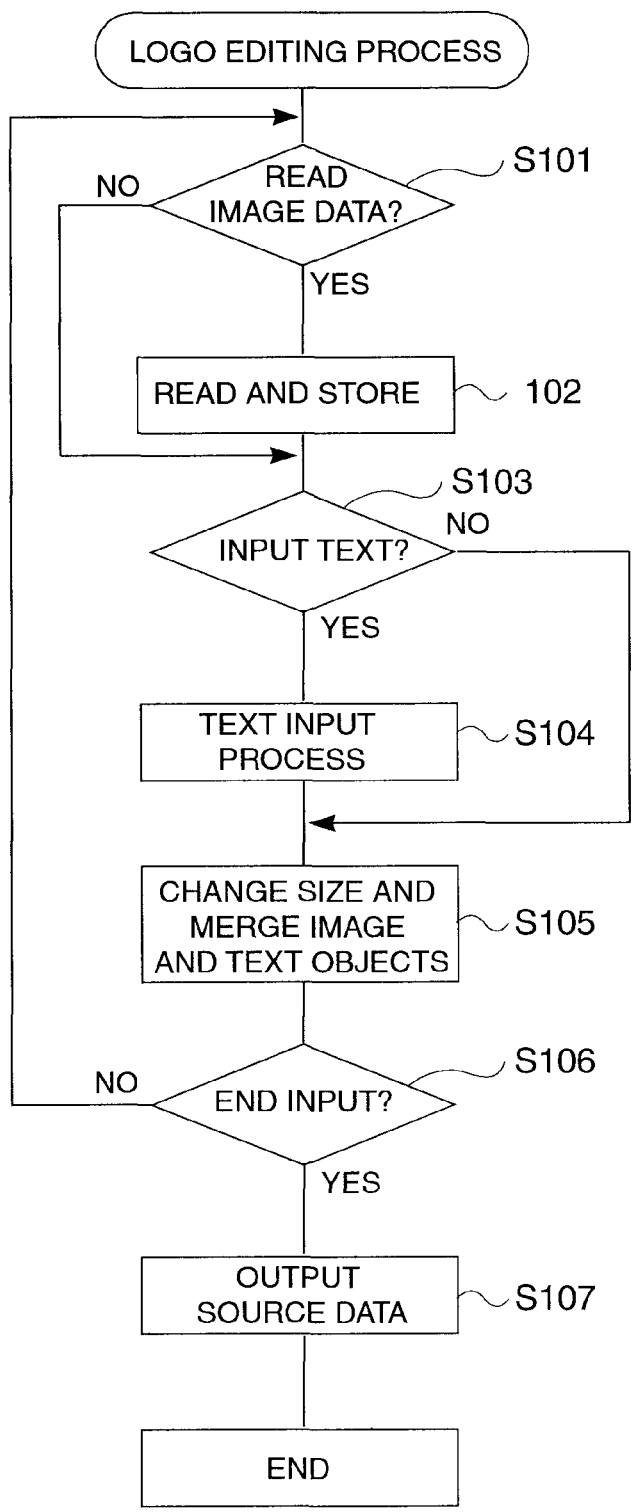
FIG. 7 is a flow chart of a logo editing method for creating the source data according to a preferred embodiment of the invention.

The logo editing process is described next with reference to FIGS. 7 to 13. FIG. 7 is a flow chart of a preferred embodiment of the logo editing method for generating logo data according to the present invention, and FIGS. 8 to 13 show examples of some screens presented for inputting data as part of this logo editing process.

A preferred embodiment of the logo editing process of the invention is described first with reference to FIG. 7.

Figure 10:
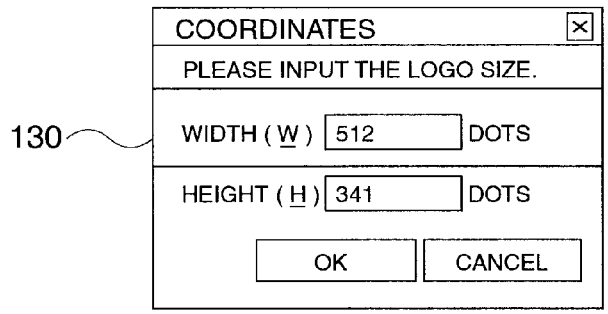
FIG. 10 shows an exemplary size input dialog box displayed to specify the size of the logo (source data) when creating new source data using the logo editing tool.

The first step when the logo editing tool 2 starts is to select whether to create a new source data file for a logo, or edit a source data file previously created with the logo editing tool 2. If a new logo is created a screen such as shown in FIG. 10 for setting the logo size is displayed. Once the logo size is set, an editing screen is displayed according to the set size.

Whether to read the image data from which the source data is generated is then determined (S101). The image data is typically read from a file, but this could be a source data file 3 previously generated by the logo editing tool 2, or some other existing image file. If a file is to be read (S101 returns yes), the read file is selected and read, and then stored in logo editing tool 2 (S102). If reading a file is not necessary (S101 returns no), the procedure advances to step S103. If editing an existing source data file 3 or if a logo is created using only text, for example, this image reading step can be skipped.

Whether drawing or text input is necessary is then determined (S103). If it is (S103 returns yes), the input routine is run (S104). If not (S103 returns no), the procedure advances to step S105. In step S105 the size of the read image data or text data is changed, or multiple images or text objects are combined according to the user's instructions. If input is not completed (S106 returns no), steps S101 to S106 repeat on the editing screen until input for all drawing, text, and merging operations is completed. When input is completed (S106 returns yes), the result is stored internally as source data or output as a source data file (S107).

The logo editing process is further described below using examples of the display screens presented during the logo editing process, as shown in FIGS. 8 to 13. Note that the process described below using these exemplary display screens is substantially the same in content and result as the process described with reference to the flow chart of FIG. 7, but not does not necessarily have a one-to-one to the flow chart of FIG. 7.

Figure 8:
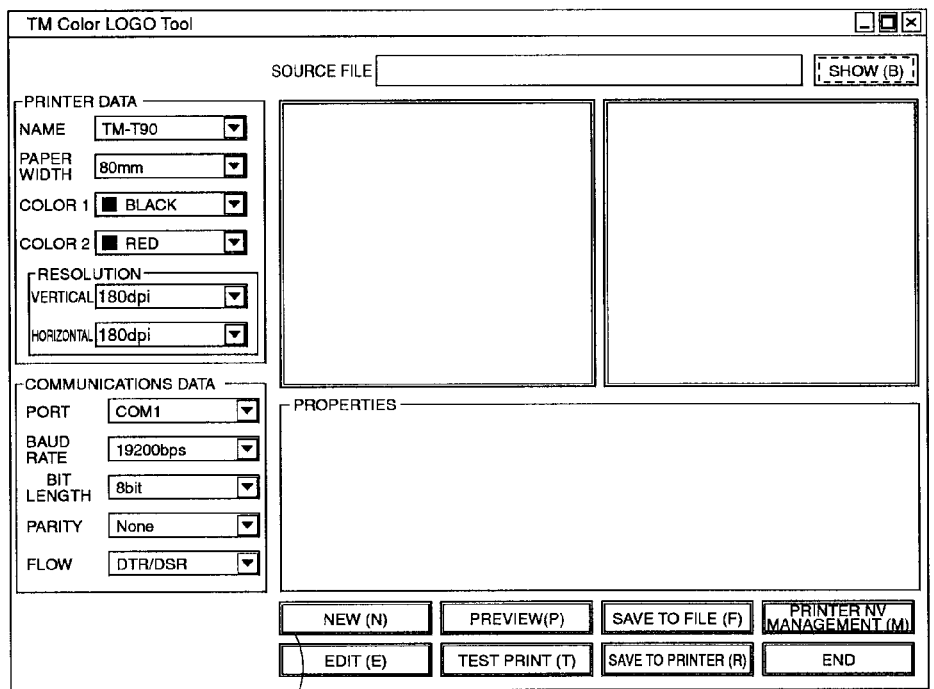
FIG. 8 shows the main screen of a logo editing tool or logo data generating system according to the present invention.
Figure 9:
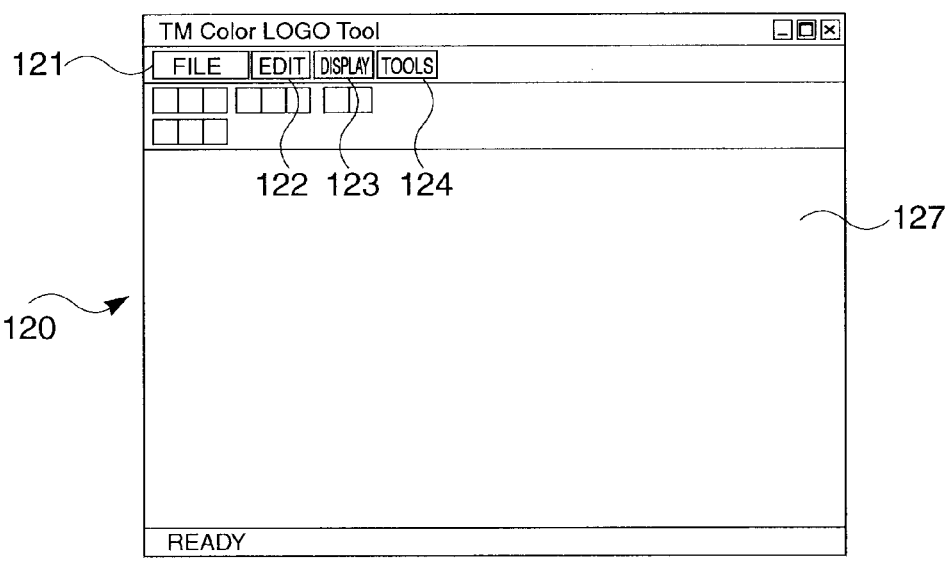
FIG. 9 shows an example of the main editing screen of a logo editing tool according to the present invention.

When the logo editing tool 2 or logo data generating system 4 starts up, a main screen 100 (FIG. 8) used for both logo generation and editing is presented in a preferred embodiment of the invention. When the new logo button 110 in FIG. 8 is clicked, the main editing screen 120 of the logo editing tool is presented, as shown in FIG. 9. This main editing screen 120 includes selection options such as file 121, edit 122, display 123, and tools 124 buttons in a top toolbar, and a logo editing area 127 in the middle.

Clicking the file button 121 of the main editing screen 120 presents, for example, a pull down down menu (not shown in the figure) with selections such as new, open, close, save, save as, logo size, and quit. The "new" item is used to create new logo data, and selecting it presents a dialog box 130, such as shown in FIG. 10, for specifying the size of the logo (source data). The dialog box 130 is used to define the size of the logo for which new logo data is to be created.

The "open" item option (not shown in FIG. 9) is used to open an existing file. Selecting "open" presents a file selection dialog box (not shown in the figure) from which a source data file previously created with the logo editing tool, for example, can be selected for use. The "close" item (not shown in the figure) closes the source data file being edited; if a change was made to the source data file, a prompt asking whether to save the changes is presented. The "save" item is selected to save the source data file being edited by overwriting the previous file. If "save" option is selected when creating a new source data file, a dialog box asking the user to specify a name for the newly created source data file is presented. The "save as" item (also not shown) is used to save the currently opened source data file under a different name. The "logo size" item (not shown in the figure) is for changing the logo size of the source data being edited, and selecting it presents the same dialog box as shown in FIG. 10 for changing the logo size of the source data. Selecting "quit" causes the logo editing tool to cease its execution. If a file with unsaved changes is open when the "quit" option is selected, a dialog box is presented asking the use whether to save the changes.

When the edit button 122 is selected from the main editing screen 120 in FIG. 9, a dialog box or pull down down menu with option selections such as undo (for reversing the previous operation), cut, copy, paste, and select all (none of which are shown in the figure) is presented. These functions are well known in the art and are the similar to functions provided in commonly available word processors and other programs.

Selecting the "paste" item pastes an object on the clipboard into the logo (source data) being edited. The types of objects that can be pasted include: text; dib format, bmp format, JPEG format, and other common drawing or graphics format object types; source data files created with the logo editing tool 2; logo data files created with the logo data generating system 4; and any other type of graphic object that can be recognized by the editing tool. If the object on the clipboard is a bitmap object, it is treated as an image object.

Selecting the "select all" option selects all objects in the source data being edited. Cut, copy, move, delete, and other operations can then be applied to the selected objects.

Selecting the "display" option button 123 from the main editing screen 120 in FIG. 9 presents a dialog box or pull down down menu containing items such as "zoom in" for enlarging the display, "zoom out" for reducing the display, "show grid," "align to grid" for selecting whether to automatically place objects on a grid, and "define grid" for setting the X-Y grid units and alignment. Note that these options are well understood in the art and none of these selections are shown in the figures.

When the tools button 124 is selected from the main editing screen 120 in FIG. 9, a dialog box or pull down down menu (not shown in the figure) with such option items as insert, text properties, image properties, input coordinates, bring to front, and send to back is presented. Note that none of these items are shown in the figures.

When "insert" is selected, a submenu with "text" and "image" items is presented (not shown in the figure). Selecting "text" enables the user to insert a text object of a specific size and position determined by clicking and dragging in the logo editing area 127. Selecting "image" similarly enables the user to insert an image object of a specific size and position determined by clicking and dragging in the logo editing area 127. When an image object is inserted, an image properties dialog box is presented for the user to select the image file to insert.

Figure 11:
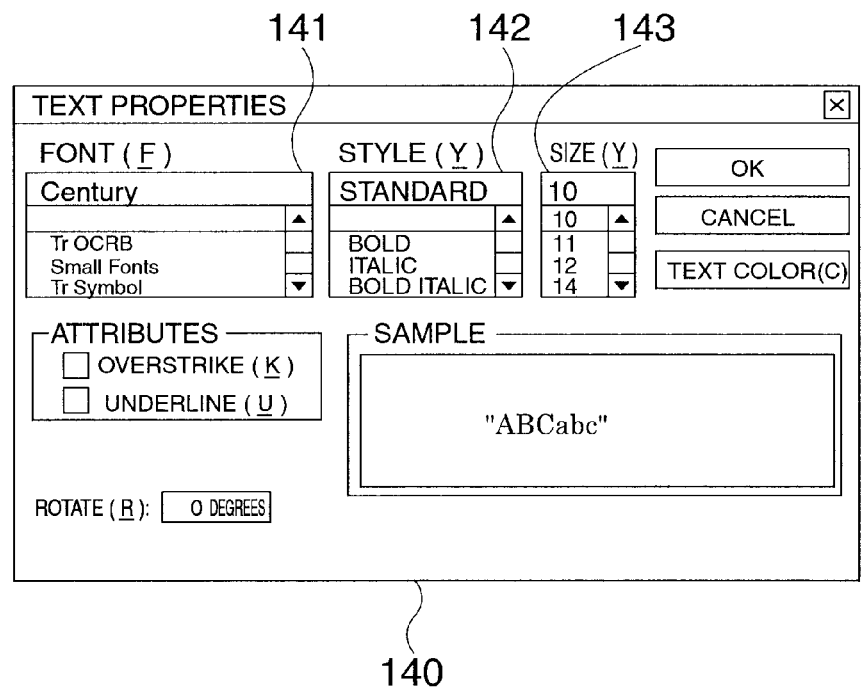
FIG. 11 shows an exemplary text property input screen displayed to set text properties when editing the source data.

If "text properties" is selected a text object properties dialog box 140 such as shown in FIG. 11 is presented. From the text object properties dialog box 140 the font selection box 141 enables selecting various "WIFE" fonts, "TrueType" fonts, or other font types. The supported styles of the selected font can then be specified using the style selection box 142, and the supported text size can be specified in the size box. Other text attributes, such as underlining, color, and text object rotation can also be selected.

Figure 12:
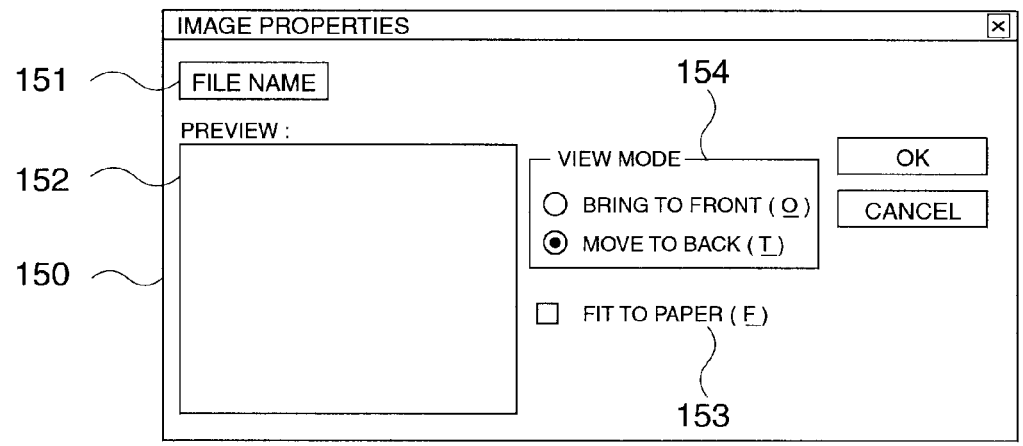
FIG. 12 shows an exemplary image property input screen displayed to set image properties when creating or editing the source data using the logo editing tool.

When "image properties" is selected an image object properties dialog box 150, such as shown in FIG. 12, is presented. When the file name of the image file to be read is input in the file name box 151, the image file is read and displayed in the preview area 152. A reference button (not shown in the figure) can also be provided to present thumbnail images of the available image files to make finding a particular image file easier. Selecting the "fit to page" checkbox 153 changes the size of the image data to the width of the selected paper. This function automatically adjusts the image size to the width of the paper when the paper used by the printer has been defined. The image object can be set to "opaque" or "transparent" from the drawing mode box 154. "Opaque" causes the object to print in front regardless of any background objects. "Transparent" makes the front object transparent so that a background object is displayed as the result of a logical OR between the background and foreground objects.

Figure 13:
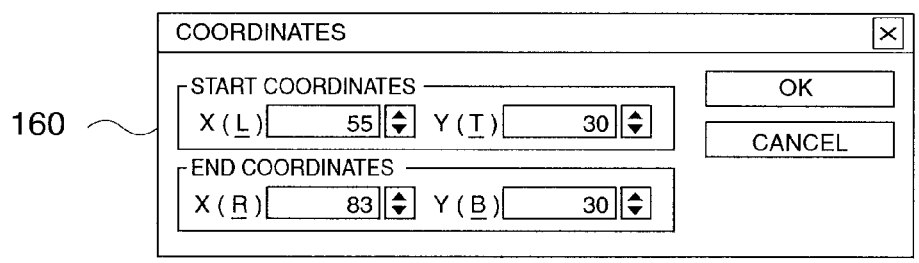
FIG. 13 shows an exemplary position input screen displayed to specify the position of a logo using the logo editing tool.

When "input coordinates" is selected from the tools button 124 a dialog box 160 such as shown in FIG. 13 is presented. This dialog box enables specifying the X-Y coordinates of the top left corner of the selected object.

Selecting the "bring to front" option item displays the selected object in front of all other objects, and selecting "send to back" option item displays the selected object in the background behind all other objects.

It will be obvious that other menu selections such as stack, pane, arrange icons, and version information may also be provided.

Generating Logo Data

Figure 14:
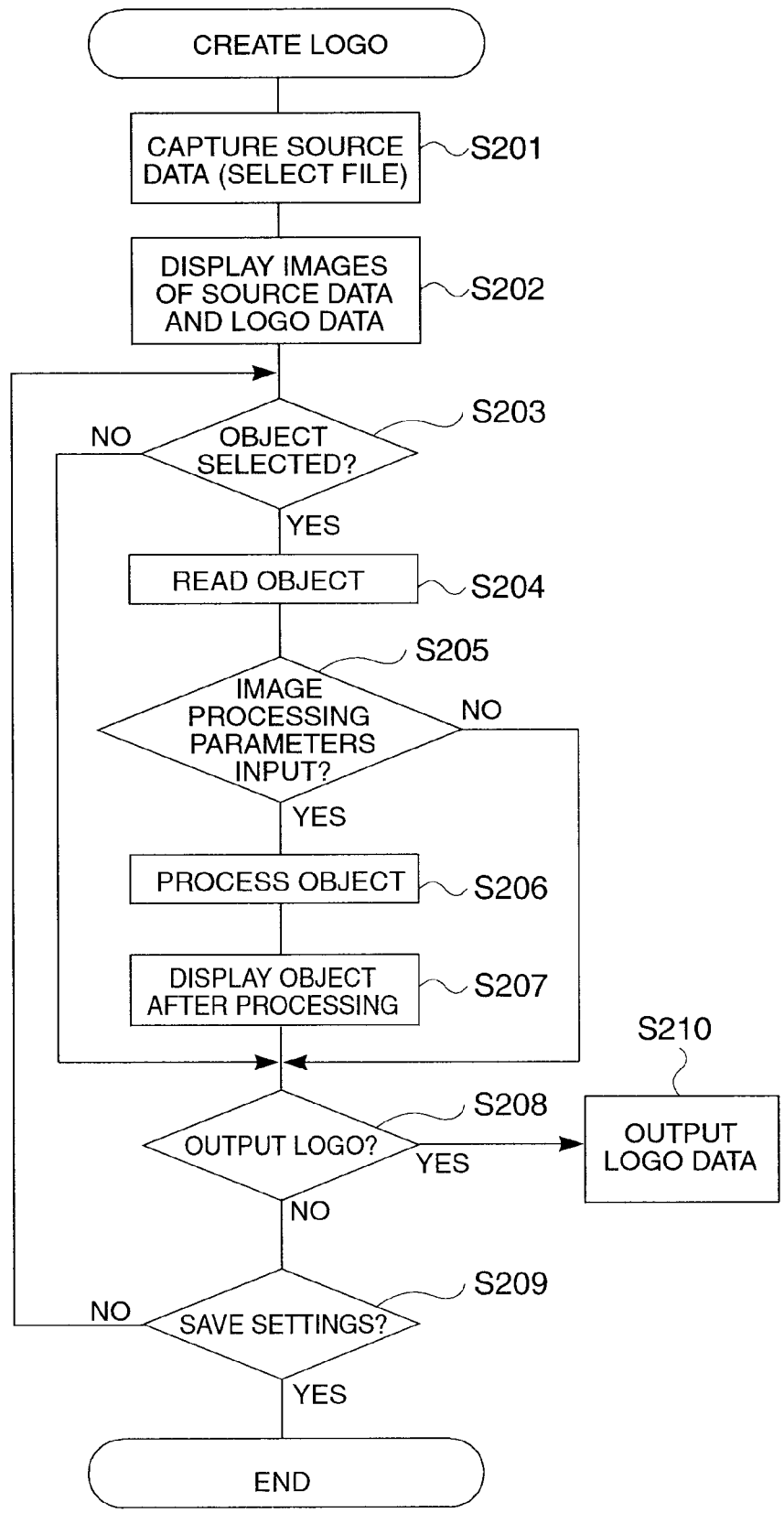
FIG. 14 is a flow chart showing a logo generating method according to a preferred embodiment of the present invention.

An exemplary process for generating logo data is described with reference to FIG. 14. FIG. 14 is a flow chart showing a logo data generating method according to this embodiment of the invention.

The first step is to read and store for processing a source data object from a source data file 3 prepared with the logo editing tool 2 or image file 82 as described above (S201). An image of the stored source data is then displayed on screen (such as display area 225 in FIG. 15) (S202). The objects in the source data can also be image processed according to the initial image processing settings and displayed simultaneously on screen (such as in display area 226 in FIG. 15).

Whether a particular object in the source data has been selected for image processing is then determined (S203). If no object has been selected (S203 returns no), the procedure advances to step S208. If an object has been selected (S203 returns yes), the selected object is read and input screens for setting the image processing parameters for the selected object are presented (such as areas 228 and 229 in FIG. 15 and the screens shown in FIG. 16 and FIG. 17) (S204). Whether the image processing parameters were input is then detected (S205). If not (S205 returns no), the procedure advances to image processing (S208) while displaying the image processed with the initial settings. If the parameters are input (S205 returns yes), the selected object is processed using those parameters (S206) and the processed image is then displayed (S207). Note that the processed image is continually displayed until the parameters input (S205) is changed, and updated if the parameters input (S205) is changed. By thus displaying an image of the source data, the user can set the parameters for the next processes, that is, defining the color assignments and color reduction method, while referring to the colors, pattern, and overall impression of the source data image.

Whether to output the logo data is then confirmed (S208). The data resulting from image processing is output (S210) if logo output is selected (S208 returns yes). If the logo is not output (S208 returns no) and the user has finished adjusting the image processing parameters (S209 returns yes), the logo generation process ends. If the user has not finished setting the parameters (S209 returns no), the procedure loops back to S203 and the same process repeats.

Logo output and whether parameter adjustment is completed are determined from data input to the parameter input unit (such as the various input screens described above). Logo data output is further described below.

H1. Alternative Logo Data Generating Process

Figure 29:
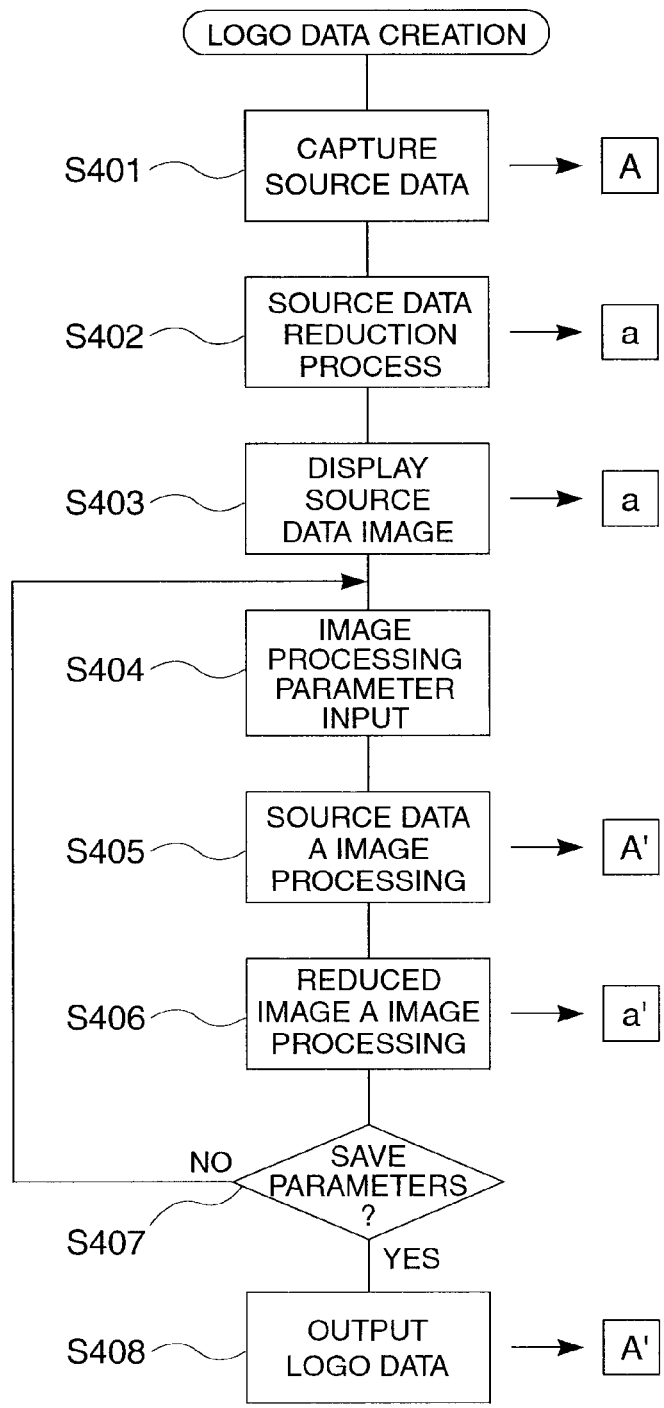
FIG. 29 is a flow chart of the logo data generating method according to an alternative embodiment of the present invention.

The logo data generating procedure in the reduced image display process is described next with reference to FIG. 29. FIG. 29 is a flow chart of a preferred embodiment of logo data generation according to the present invention. The images resulting from and related to the various steps in the flow chart in FIG. 29 are shown to the right where "A" is the source data image, "A'" is the image after image processing, "a" is the reduced view of image "A", and "a'" is the reduced preview image of logo "A'". Logo generation is described according to the flow chart.

The first step is to read and store the source data objects for processing from an existing image file or source data file created with the logo editing tool 2 (S401). The stored source data image A is then reduced to a specific size to create reduced image "a" (S402), which is displayed on screen 20 (FIG. 5 or 6) (S403). The user can thus set the parameters for the next processes, that is, defining the color selections or assignments and color reduction method, while referring to the colors, pattern, and overall impression of the source data image. If confirming the size-reduced source data image is not necessary, this step (S402) can be skipped and the source data image can be displayed (S403) without displaying reduced image "a".

The image processing parameters are then input (S404). Parameters specific to the printer model, assigning the colors achieving the best print results according to the specific functions of the printer, and other such parameters can be input at this step. Once the parameters are set the source data image "A" is processed according to the defined parameters to create logo "A'" (S405). The size-reduced image "a" is also processed according to the same image processing parameters, creating preview image "a'" of the logo "A'" (S406). It will be remembered that because color reduction and other image processing steps are applied to the previously size-reduced image "a", preview image "a'" does not have the dither noise or striping that otherwise occurs. At this point both reduced image "a" of the source data and reduced preview "a'" of the image "A'" after image processing are displayed. The user can therefore compare the images before and after image processing, and easily adjust the image processing parameters at the time the logo data is generated in order to achieve the best logo.

Whether the settings are finalized is then confirmed (S407). If input is not completed and settings are adjusted (S407 returns no), steps S404 to S407 repeat. The user can thus continue to adjust the image processing parameters while confirming what the processed image "a'" will look like in order to achieve the best logo. When the parameters are finalized (S407 returns yes), the logo data is output (S408).

It should be noted that while the source data image reduction process (S402) is provided immediately after the source data is read in FIG. 29, this step can be provided after the image processing step (S405) if a reduced view of the source data is not displayed. Furthermore, the present invention is characterized by applying the size reduction process to the source image before the color reduction process, and any modification in accordance with this principle of the invention is within the intended scope of this invention.

The logo data generating process of this invention is further described below using the sample display screens of this logo generating process as shown in FIG. 8, FIG. 15 to FIG. 19, FIG. 30 and FIG. 31. Note that the process described below using these exemplary display screens is substantially the same in content and result as the process described with reference to the flow chart in FIG. 14, but not does not necessarily have a one-to-one correspondence to the FIG. 14 flow chart.

In a preferred embodiment of a logo data generating system according to the present invention a main screen 210 identical to the main screen 100 shown in FIG. 8 by the logo editing tool 2 is displayed first. This main screen 210 has a printer data input box 220 used to input the paper width, printable colors, print resolution, and other parameters specific to the printer model. A communication parameters input box 221 enables the user to specify the port, communication speed, and other communication parameters. These printer parameters and communication parameters are preferably set automatically as much as possible by simply specifying the name of the printer in the printer data input box 220. It is also possible to store this model-specific data inside the printer so that when the model name is specified the specific parameters are read from the printer and set automatically.

The source data used to create a logo can be read from a desired file by submitting a file name to the source file box 223. The reference button 224 can also be clicked to reference a selection of available files in a pull down down menu, for example. An image of the source data is displayed in the first display area 225 and an image of the source data after it is processed according to the input image processing parameters is displayed in a second display area 226. The most commonly used files will be source data files created by the logo editing tool 2, but providing the ability to read as many different file types as possible will make it possible to use images from a wider range of sources as the logo source data.

Figure 15:
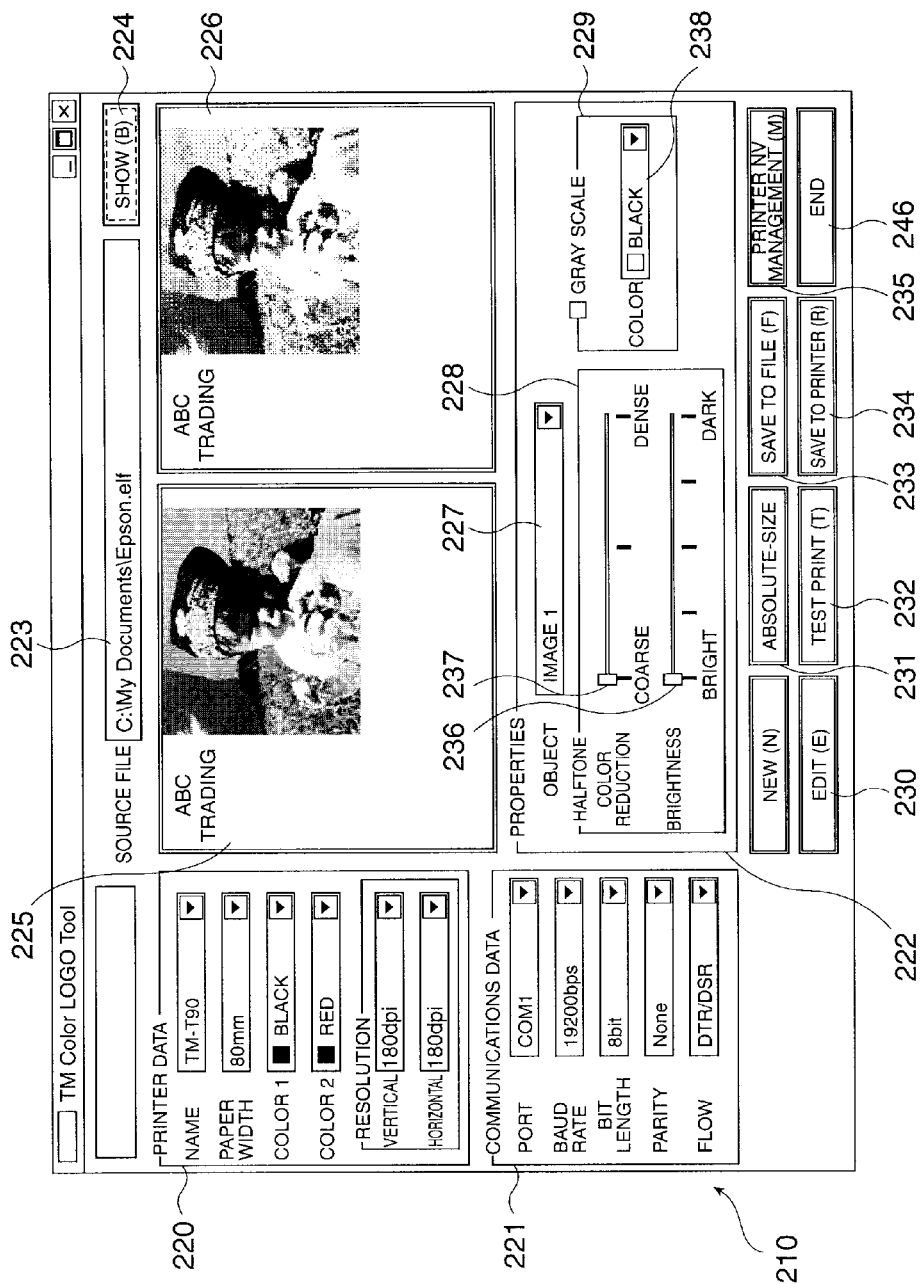
FIG. 15 shows an exemplary logo editing screen used to set the parameters for reading the source data and generating the logo data.

Reading the source image, parameter setting, and image processing are described next. FIG. 15 shows the main screen 210 after a file has been read from the main screen 100 (FIG. 8) and certain parameters have been set. FIG. 15 shows reduced views of the source data image and the source data image after image processing, but it will be obvious that these images could alternatively be displayed without being reduced.

When the file name is input to the source file box 223 of the main screen 100 (FIG. 8), the content of the specified file is read as the source data and stored to a particular address in memory. The stored source data is then reduced to display a reduced image a of the source data as shown in first display area 225 (FIG. 15) of the main screen 210.

The name, paper width, printable colors, resolution, and other parameters specific to the target printer can be input from the printer data input box 220. The communication port, data transfer rate, bit length, and other model-specific data related to communicating with the printer can be input from the communication parameters input box 221. It is also possible to read model-specific data for the indicated printer from a model-specific data buffer (not shown in the figure) so that the model-specific data is set automatically when the printer name is input or specified. If the target printer is connected, it is further possible to automatically read a model ID from the printer to set the corresponding model-specific data automatically. The color assignments for color conversion, color reduction method, and other parameters can also be input using the properties input box 222.

Note that color selection menu in the printer data input box 220 enables the user to select one set of the printable colors from all of the printable colors, (in FIG. 15, black as the first color and red as the second color are selected) which are specified by the target printer. The selected set of printable colors is used for the color assignments in the properties input box 222. Displaying only the printable colors on the color selection menu in the printer data input box 220 could prohibit selection of a color not among said printable colors.

Reduced image "a"' of the data image processed according to the model-specific data and defined properties is displayed in second display area 226. Until the model-specific data and properties are defined the data is processed using existing settings or preset values, and the processed image is then displayed in the second display area 226 of the main screen 210. If a two-color printer is used, for example, a preview of the print image (logo) using the shades that can be achieved with three colors, that is, the two printable colors and white (the non-printing color of the paper), is displayed. If the print resolution of the printer is low, the image is also displayed as a low resolution image.

It should be noted that because a reduced preview of the processed image is displayed in the second display area 226 in this embodiment, the full-size button 231 can be clicked to display the print image at the same size it will be printed (not shown in the figure).

Defining the image data and text data properties is described next with reference to FIG. 15 to FIG. 18. The properties defined with reference to these sample screens are the properties used for image processing the source data 3 created with the logo editing tool 2. As described above, the source data created with the logo editing tool 2 can contain multiple image data and/or text data objects. The first step is selecting the object to edit using the object selection box 227 in the properties input box 222 of FIG. 15. If, for example, "image 1" is selected, "image 1" is processed according to the parameters determined with the halftone definition box 228 and gray scale control box 229, and an image of the logo reflecting the processed "image 1" is displayed in second display area 226. Individual image or text objects can be selected and processed by selecting the specific object from the list of all objects combined in the logo from the object selection box 227 in the properties input box 222.

The color reduction slider 237 in the halftone definition box 228 slides left to right to specify the color reduction method in varying stages from coarse to fine. For example, three levels from coarse to fine, that is, simple color reduction, dithering, error diffusion, could be used. A brightness slider 236 can also be moved sideways to set the image brightness on a sliding scale with five levels, for example.

When the gray scale control box 229 is selected (on), the image can be reduced to a monochrome gray scale image; when deselected (off), the source data is reduced to all printable colors (two in this example). When reduced to a gray scale image, the monochrome color can be specified from the color input box 238, or selected from a pull down menu, for example.

Figure 16:
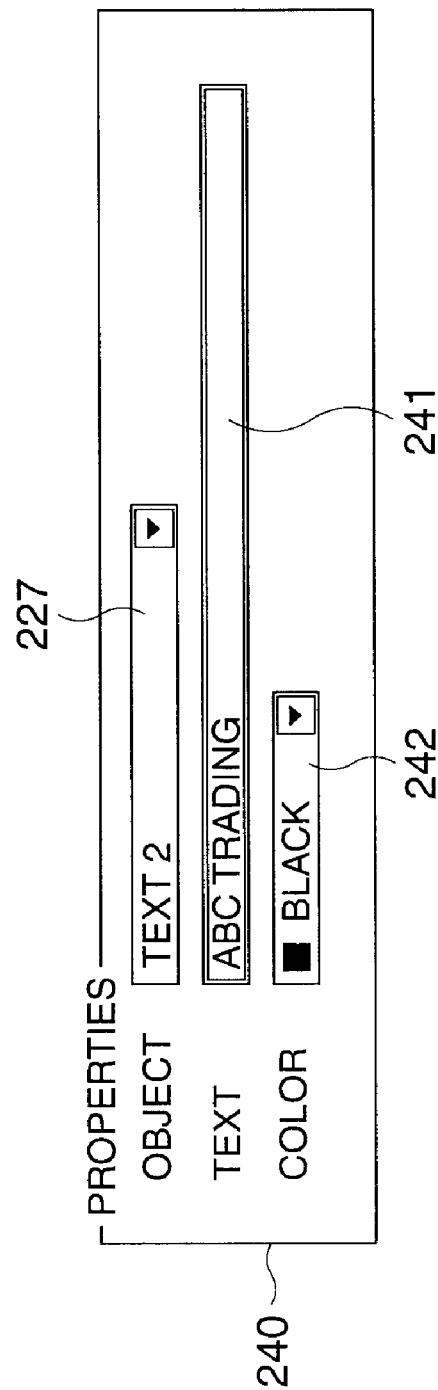
FIG. 16 shows an exemplary property input dialog box displayed by the logo data generating system to input text data for a particular object.

If text object 2 is selected from the object selection box 227 of the properties input box 222, for example, a text object properties definition box 240 as shown in FIG. 16 is presented in the properties input box 222 of FIG. 15. The user can then enter the desired text to the text input box 241, and specify the color of the text in the text color box 242 using a pull down menu, for example.

Figure 30:
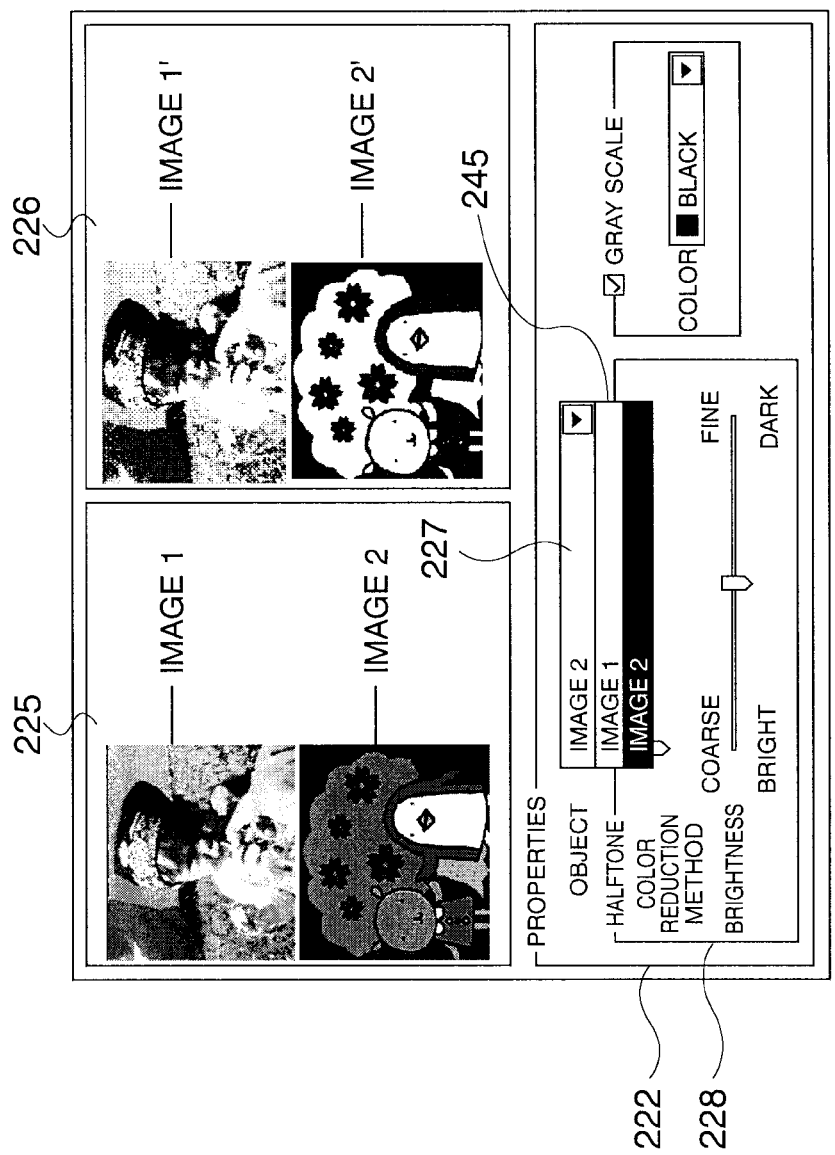
FIG. 30 shows an exemplary display when image processing is applied separately to individual objects.

An example of image processing individual objects is described next with reference to FIG. 30. Clicking on the menu icon of the object selection box 227 in the properties input box 222 causes a pull down menu 245 to drop. The object to process, "image 1" or "image 2" in this example, can then be selected from the pull down menu 245. An image of the selected object is then displayed. Color reduction, brightness, and gray scale options are controlled from the halftone definition box 228 as described above. It is therefore possible to separately define how each object is processed. For example, image 1 could be processed using dithering for color reduction and no gray scale processing, while simple color reduction and gray scale conversion could be applied to image 2.

Figure 31:
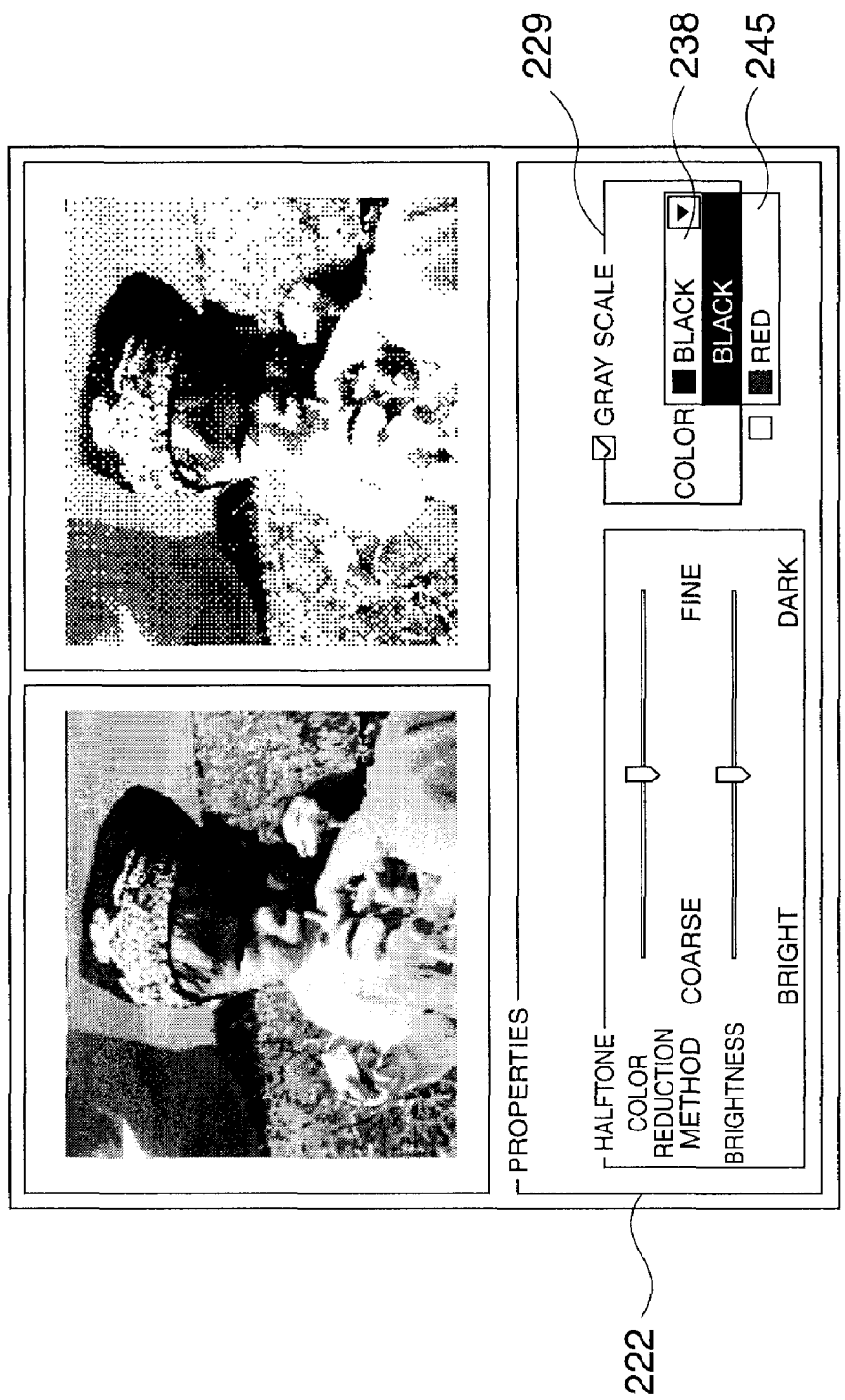
FIG. 31 shows another exemplary display when image processing is applied separately to individual objects

The gray scale conversion process is further described with reference to FIG. 31. A different pull down menu 245 drops down when the menu icon beside the color input box 238 in the gray scale control box 229 of the properties input box 222 is clicked. The user can select the desired color from the pull down menu 245 (black, for example). When the desired color is selected, the image is converted and displayed in the second display area 226.

Figure 17:
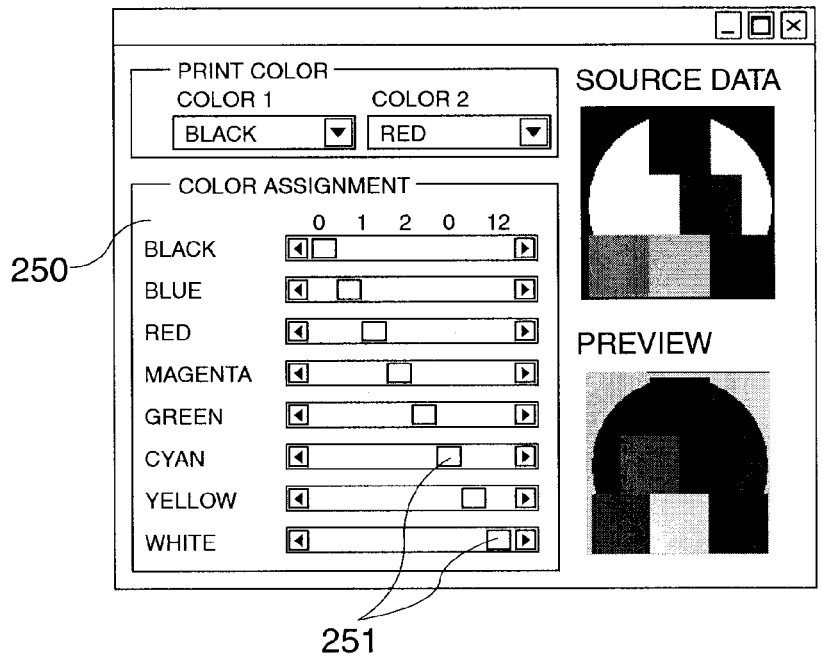
FIG. 17 shows an exemplary screen for defining numerous color assignments, (a) showing an example in which 15 colors are assigned to eight colors after reducing the source data to eight colors, and (b) showing an example in which three colors are assigned to source data reduced to eight colors.
Figure 17:
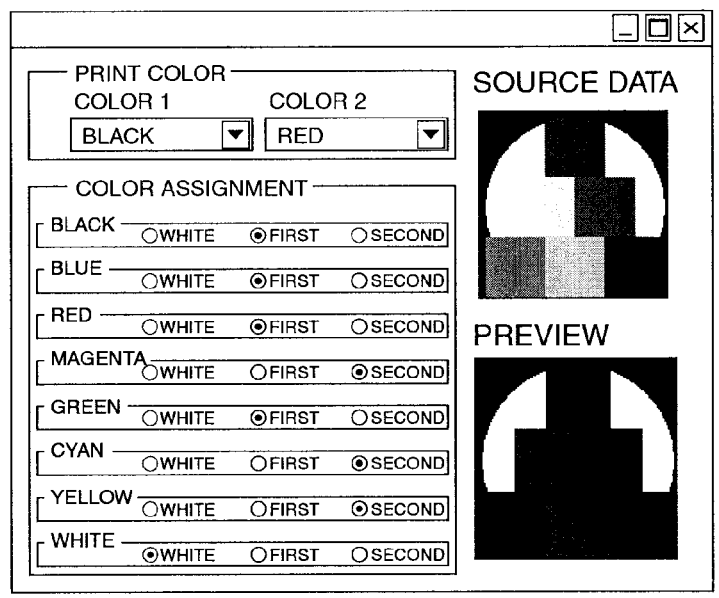

An example of a screen enabling a variety of color assignments is described next with reference to FIG. 17. FIGS. 17 (*a*) and (*b*) show example screens each enabling a color selection for converting colors in the source data to the printable color. The screen shown in FIG. 17 (*a*) enables a color selection for converting eight colors in the source data to 15 colors after reducing the source data to eight colors. The screen shown in FIG. 17 (*b*) enables a color selection for converting eight colors in the source data to three colors after reducing the source data to eight colors. Reduction to eight colors results from a preset color reduction method or selecting an appropriate color reduction method from the color reduction slider 237 of the halftone definition box 228.

The example screen shown in part (a) of FIG. 17 applies to a printer with two printable colors. In this example the first color is black and the second is red. The eight colors of black, blue, red, magenta, green, cyan, yellow, and white are converted to one of 15 tones by setting the color assignment sliders 251 in the assignment area 250 to a position from "0"→"1"→"2"→"0"→"12". An image of the source data is displayed at the top, and the image after color assignment is displayed at the bottom, on the right side in FIG. 15.

Figure 18:
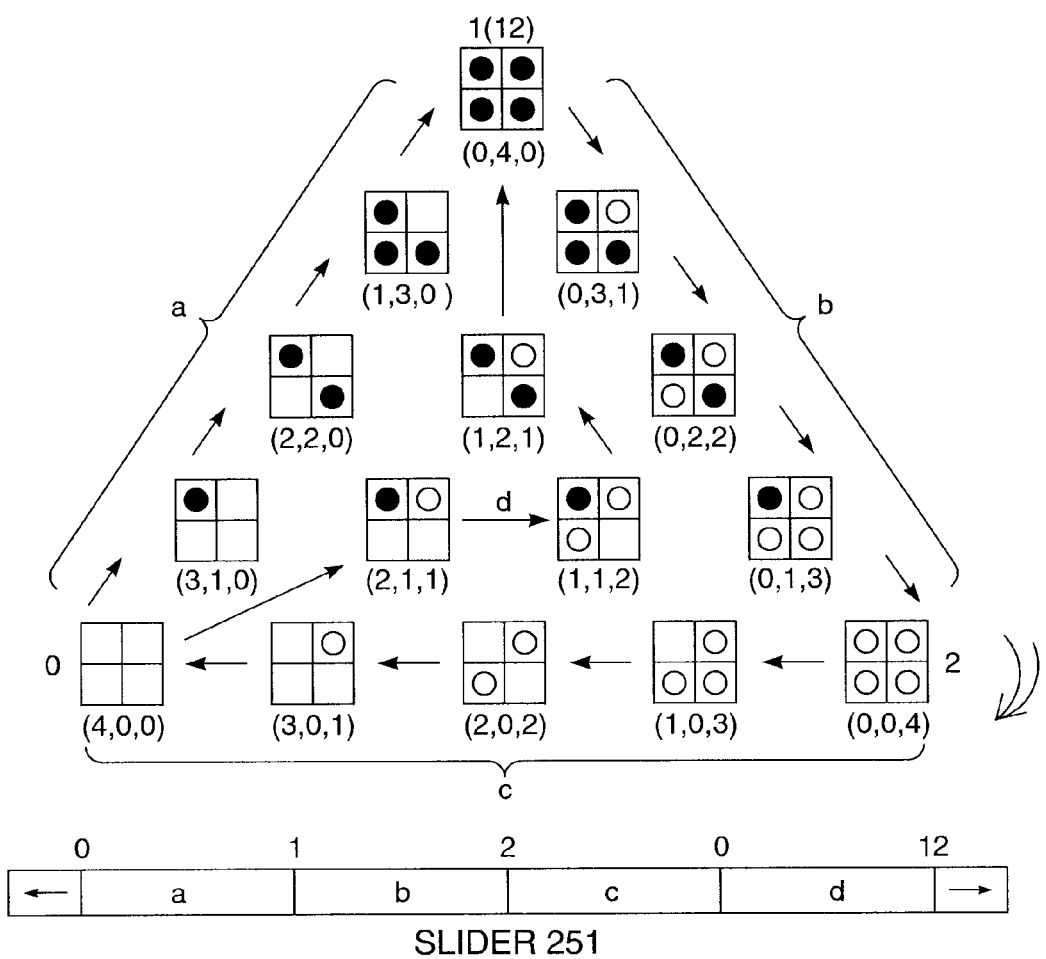
FIG. 18 shows the relationship between the color assignment slider 251 shown in FIG. 15 and the 15 colors that can be expressed using four dots per pixel in a printer that can print two colors (three colors in including the non-printing color) per dot.

To describe how fifteen tones are assigned with the color assignment sliders 251 in FIG. 17, how a printer with two printable colors can print fifteen colors, and how the color assignment slider 251 specifies fifteen colors, are described referring to FIG. 18.

If there is a total of three colors, that is, two colors of ink and white, the non-printing color of the paper, and each pixel is a 2×2 matrix assigning four dots to each pixel, each pixel can express fifteen tones by appropriately assigning the color of each pixel. The relationship between these fifteen colors and the color assignment slider 251 shown in FIG. 15 is shown in FIG. 18. In FIG. 18 a black dot (•) represents black, a circle (○) represents red, and a blank represents a white dot. The values (x,y,z) below each matrix show the number of (white, black, red) dots in the matrix (pixel). In other words, the shade of each unit pixel is determined by the ratio of color dots in the four dots constituting each pixel.

Area "a" (0→1) in FIG. 18 shows matrixes containing only white and black dots and shows the range (direction) from a matrix with four white dots (0) to a matrix with four black dots (1). Area "b" (1→2) shows matrixes containing only black and red dots, and shows the range (direction) from four black dots to four red dots (2). Area "c" (2→0) shows matrixes containing only red and white dots, and shows the range (direction) from four red dots to four white dots. Area "d" (0→12) shows the matrixes variously combining white, red, and black dots, and shows the range (direction) from four white to four black dots.

The relationship between the color assignments determined by the position of the color assignment slider 251 in FIG. 17 and FIG. 18 and areas a "b", and "c" will be understood from the figures. That is, the pixel changes gradually from white to black as the color assignment slider 251 moves from 0→1, from black to red as the slider moves from 1→2, from red to white as the slider moves from 2→0, and from white to a mixture of white, red, and black as the slider moves from 0→12.

By using the screen shown in FIG. 17 (*a*), for example, if black is selected as the first color and red, or another chromatic color other than black, is selected as the second color among the printable colors, the color selection parameters for color conversion can be assigned such that the achromic parts (black) of the source data are converted to the first color (black) or halftones formed from the first color (e.g. area "a" in FIG. 18), and the chromatic parts (blue, red, magenta, green, cyan, and yellow) of the source data are converted to halftones formed from the second color (e.g. area "b", "c" or "d" in FIG. 18). In the example screen shown in FIG. 17 (*b*), the source data is reduced to eight colors, specifically black, blue, red, magenta, green, cyan, yellow, and white, and each of these eight colors is converted to white, first color (black), or second color (red) by setting the color assignment. The source data and an image resulting from the color assignment are also both displayed on this screen.

By using the screen shown in FIG. 17 (*b*), for example, if black is selected as the first color and red, or another chromatic color other than black, is selected as the second color among the printable colors, the color selection parameters for color conversion can be assigned such that the achromic parts (black) of the source data are converted to the first color (black), and the chromatic parts (blue, red, magenta, green, cyan, and yellow) of the source data are converted to the second color (red).

It will thus be obvious that after the source data is reduced to a particular number of colors, the user can then easily select from the printable colors for converting each color of the source data to one of the printable colors. While fixed color assignments might assign the same color to important color borders, producing an image that is unacceptably difficult to discern, the method of the present invention enables the user to easily change the color assignments to create a printable logo that is expressive and aesthetically pleasing.

By using dithering and dot gradation to increase the number of colors with the user desirably assigning the printable colors, even printers with little color capability (such as a two color printer) can print more expressive logos.

While the source data that can be selected for color processing as determined by the properties input box 222 is limited in the above description to source data files created by the logo editing tool 2, it is also possible to design the object selection box 227 so that other existing image files can be selected as the source data for color processing according to the parameters set in the properties input box 222.

The main logo data generating screen 210 shown in FIG. 15 also has an edit button 230, print test button 232, file output button 233, printer registration button 234, non-volatile memory management button 235, and quit button 246.

The edit button 230 starts the logo editing tool, and is used to re-edit a logo data file. When editing with the logo editing tool is finished, the logo data generating system reads the content of the file being used (the edited content), and creates a logo reflecting the changes made. Editing with the edit button 230 can be enabled only when the source data file of a logo being created is a file created with the logo editing tool 2.

The print test button 232 is used to actually print the created logo data on the connected target printer. The logo data is not registered in the printer at this time.

Figure 19:
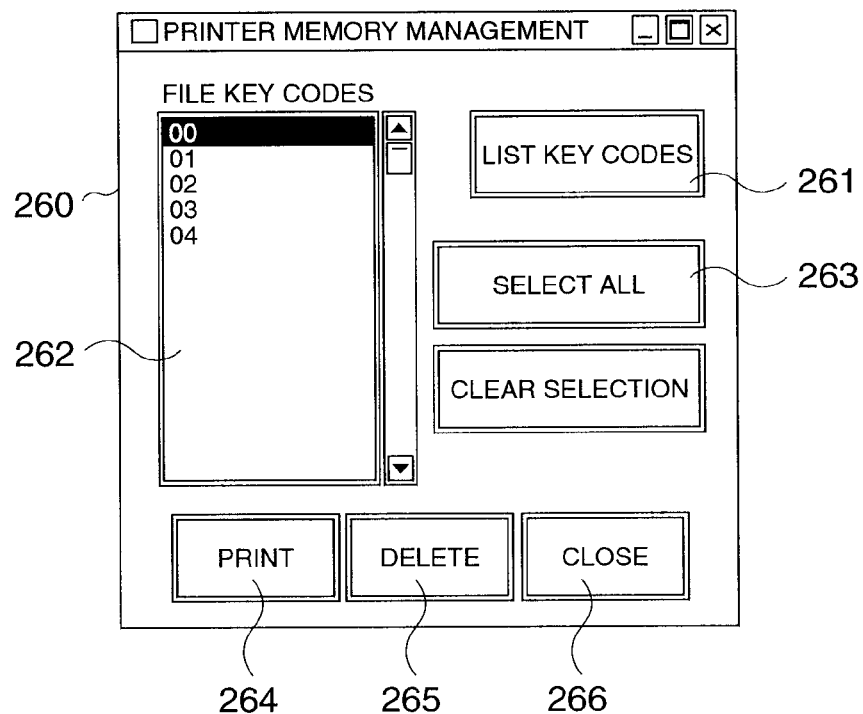
FIG. 19 shows an example of the selection dialog used for non-volatile memory management.

The non-volatile memory management button 235 enables printing or deleting logo data stored to the non-volatile memory of the target printer. Pressing the non-volatile memory management button 235 displays a non-volatile memory management dialog box 260 such as shown in FIG. 19. Pressing the get key codes button 261 reads the key codes of the graphics stored to the connected printer and displays them as a list in the key code list area 262.

Clicking the select all button 263 selects all of the key codes displayed in the key code list area 262. The selected key codes can be printed or deleted. Printing and deleting the selected key codes is selected using the print button 264 and delete button 265 at the bottom of the dialog box 260. The cancel button 267 deselects the key codes selected in the key code list. The graphics corresponding to the listed key codes are stored in the logo data generating system. Pressing the print button 264 reads and prints the graphic corresponding to the selected key code. The key code for the printed graphic can be printed in the page header.

The delete button 265 deletes the graphic corresponding to the selected key code from the internal memory. An alert is displayed before the file is deleted so that the user can confirm the deletion. Clicking the close button 266 closes the dialog box 260 and returns to the main screen 210.

Creating the Logo Storage File

Figure 20:
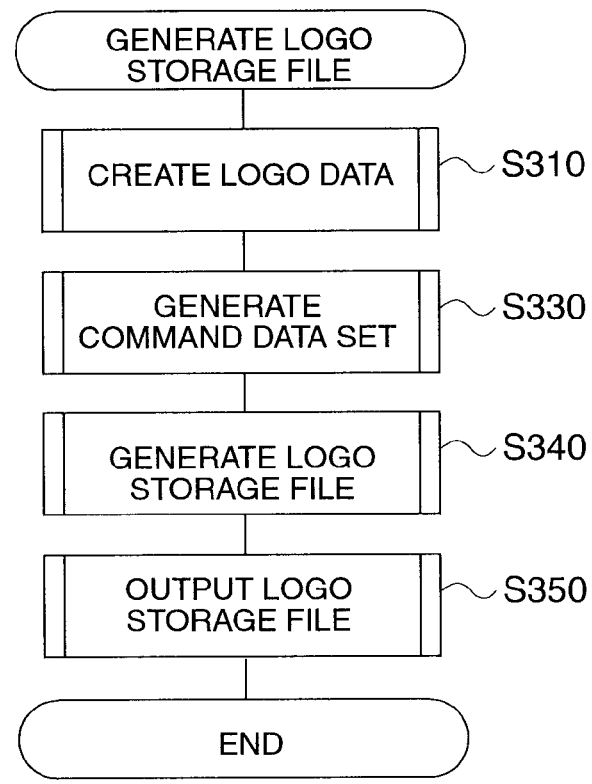
FIG. 20 is a flow chart of the process for generating the logo storage file after creating the logo data.

The process for creating the logo storage file is described in further detail below with reference to accompanying flow charts. FIG. 20 is a flow chart of the general process for creating the logo storage file 5 after the logo data is created.

The logo data (logo) is first created as described with reference to FIG. 7 and FIG. 14 by the image processing block 13 (shown in FIG. 1, FIG. 4, FIG. 5, FIG. 25) (S310). As explained above, in either of the methods of FIGS. 7 and 14, the number of colors in an image may be automatically reduced prior to the user having to assign substitute material colors to an image. For example, if three material colors (such as black, red, and white) and their associated shade levels are available, and the original image had, for example, 256 colors, then the number of colors in the image may be reduced automatically to 8 colors. The user will then have an easier time of substituting the available three material colors in place of the image's 8 colors, as opposed to having to account for the original 256 colors.

With reference to FIG. 20, after the logo data is completed (S301), a command data set is generated (S330), and the logo data and command set are combined to produce the logo storage file 5 (FIG. 2) (S340). The resulting logo storage file 5 is then stored in, i.e. transferred to, floppy disk or other medium, and/or sent to the target printer host (S350).

Figure 21:
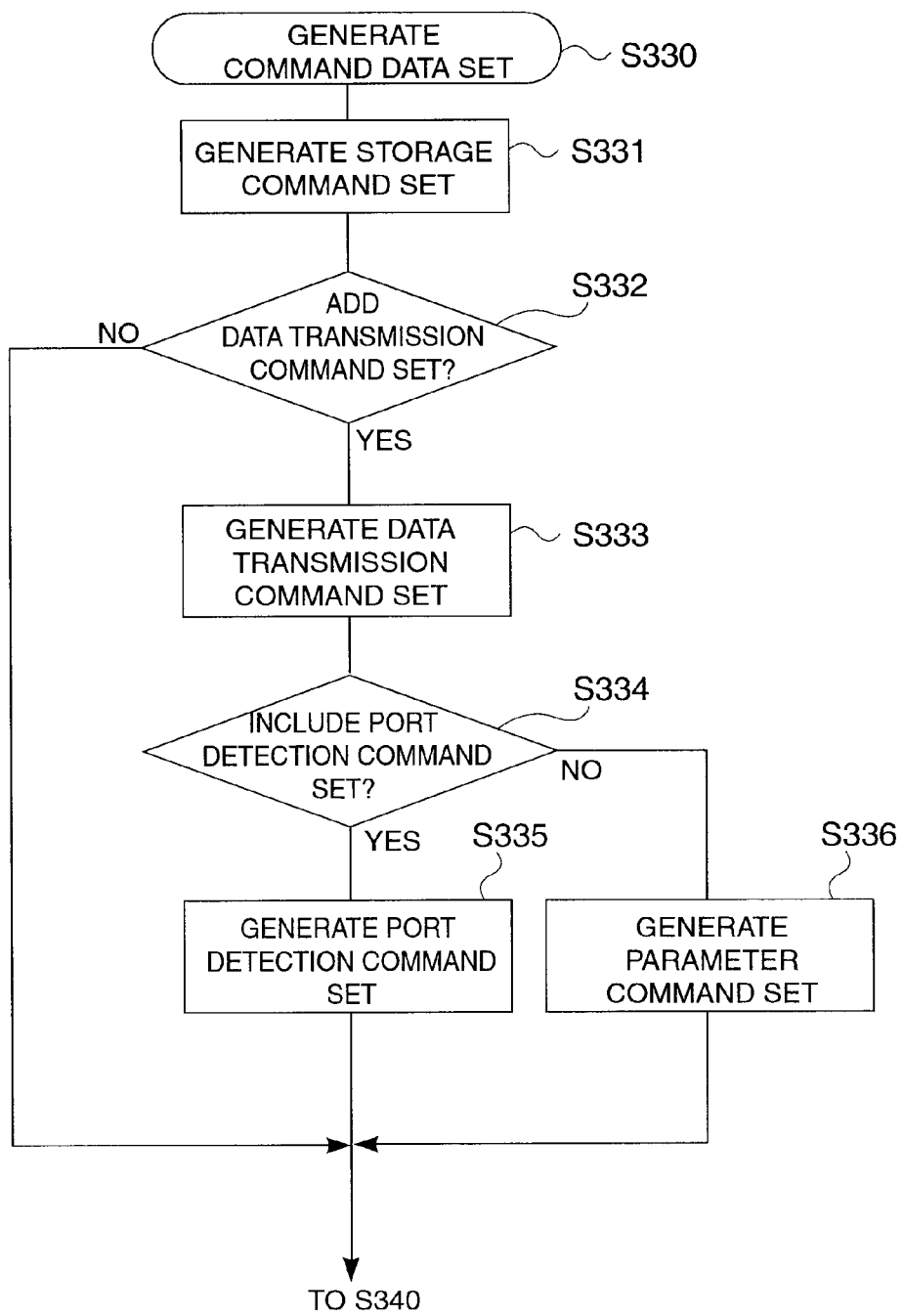
FIG. 21 is a flow chart showing the command data set generating step (S330) in FIG. 20.

FIG. 21 is a flow chart showing the step (S330 of FIG. 20) for creating the command data set in detail.

After the logo data is completed (FIG. 20, S310), a storage command set for registering the logo data in the printer is generated (S331). The storage command set is a set of commands run by the target printer to store the logo data in non-volatile memory inside the printer.

After the storage command data set is completed (S331), whether the data transmission command set is to be added to the executable command set is determined (S332). The system can be configured so that adding the data transmission command set is optional according to the logo storage file type.

If the data transmission command set is not added (S332 returns no), the procedure advances to step S340 to generate the logo storage file. If the data transmission command set is to be added (S332 returns yes), the data transmission command set is created (S333). The data transmission command set is a set of commands for sending the logo data and storage command set from the host to the target printer. This enables the host to send the storage command set and logo data to the target printer automatically when the host reads the image data storage file or when the port number and other specific parameters are set.

Whether to include a port detection command set in the data transmission command set is then determined (S334). If it is necessary to include the port detection command set (S334 returns yes), the port detection command set is created. If the port detection command set is unnecessary (S334 returns no), the parameter input command set is created (S336).

Figure 22:
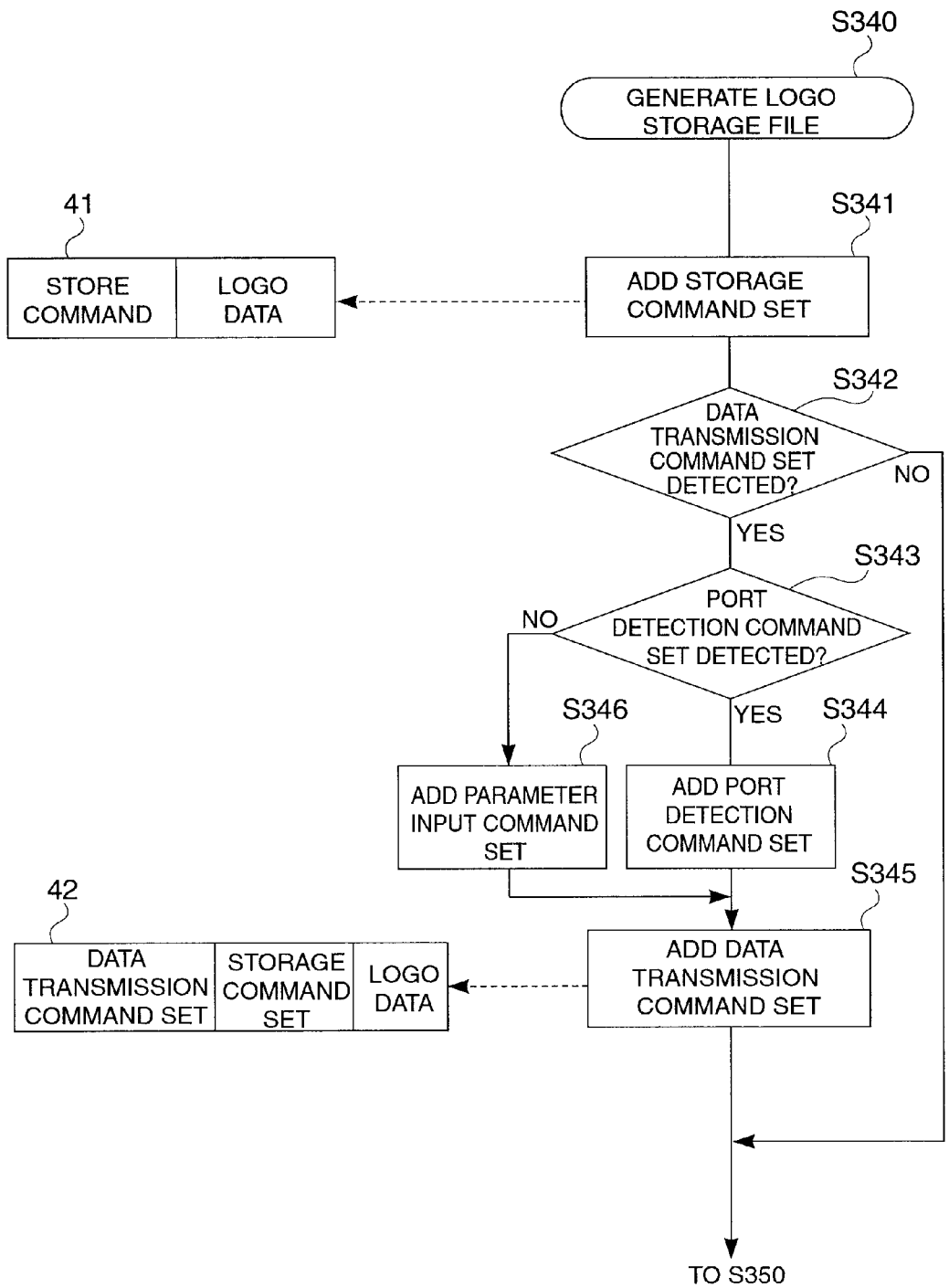
FIG. 22 is a flow chart showing the logo storage file generating step (S340) in FIG. 20.

FIG. 22 is a flow chart of the sub-step for step S340 of FIG. 20 for generating the logo storage file.

After the required command set is created (S330, FIG. 20), the logo storage file is compiled by following steps S340 to S345 in FIG. 22. The first step in this routine is to create an executable file 41 containing the logo data (print image data) and the storage command set passed from the command data set generating routine. Combining these two elements is indicated to the left of step S341. The logo data can be stored in the printer by sending this file containing the storage command set and logo data from the host to the target printer.

Decision diamond S342 then determines whether the data transmission command set was generated in the command data set generating routine (S330). If it was not (S342 returns no), the merged file 41 from step S341 is output as the logo storage file 5. If the data transmission command set was also generated (S342 returns yes), decision diamond S343 determines if the port detection command set is also present. If the port detection command set was also passed (S343 returns yes), the port detection command set is combined with the data transmission command set (S344). If the port detection command set was not created (S343 returns no), the parameter input command set is combined with the data transmission command set (S346).

A combined executable file 42 (shown on the left side in FIG. 22) combining the appropriate data transmission command sets with the executable file 41 generated in step S341 is then created and output as the logo storage file (S345).

If the port detection command set is included in the data transmission command set in the integrated executable file 42, the port detection command is run when the logo storage file is read by the host, the communication port to which the printer is connected is automatically detected, and the storage command set and logo data are automatically sent from the host to the printer.

If the parameter input command set is included in the data transmission command set of the combined command data set 42 (FIG. 22), the parameter input command set is run when the host reads the logo storage file so that the communication parameters can be input from the host. When the communication parameters are set, the storage command set and logo data are sent to the printer from the specified communication port.

As will be known from the above description, the logo editing tool 2 and logo data generating system 4 of the present invention make it possible to easily create logos optimized for a variety of printing purposes, store the resulting logos to a printer, and recall and edit logo data for different purposes. Color logo printing can therefore be used effectively according to the specific printing objective.

The present invention has been described with reference to a printer, but it will also be obvious that the invention shall not be limited to printer applications and can be used for storing a logo in a display device with limited color display capabilities.

The invention has also been described as a way to speed logo printing by storing an archive of logos in the logo memory 61 (FIG. 2) of a printer 60. However, the basic concept of color logo color reduction and color assignment according to the present invention can also be applied to other applications printing a color bitmap on a printer capable of printing only limited colors (such as only 2 colors), including printer drivers or a device control system such as provided by OLE for Retail POS (referred to as "OPOS" below) for the Windows (R) operating system. More specifically, applications such as these conventionally require using a separate bitmap conversion tool to convert a full-color image to a 2-color image for printing. Using the present invention, however, these files can be printed without this file conversion step.

Figure 23:
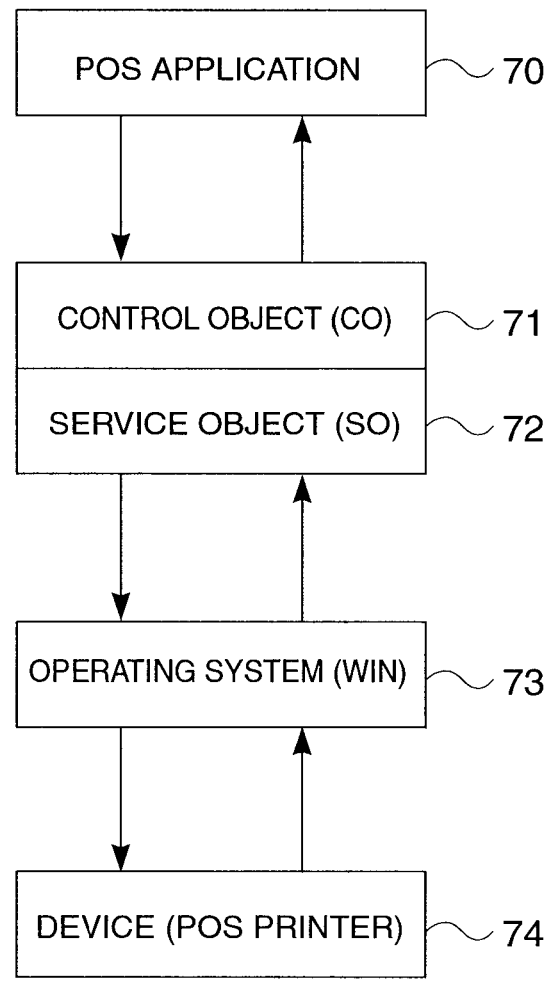
FIG. 23 shows the basic configuration of OLE for Retail POS (OPOS).
Figure 24:
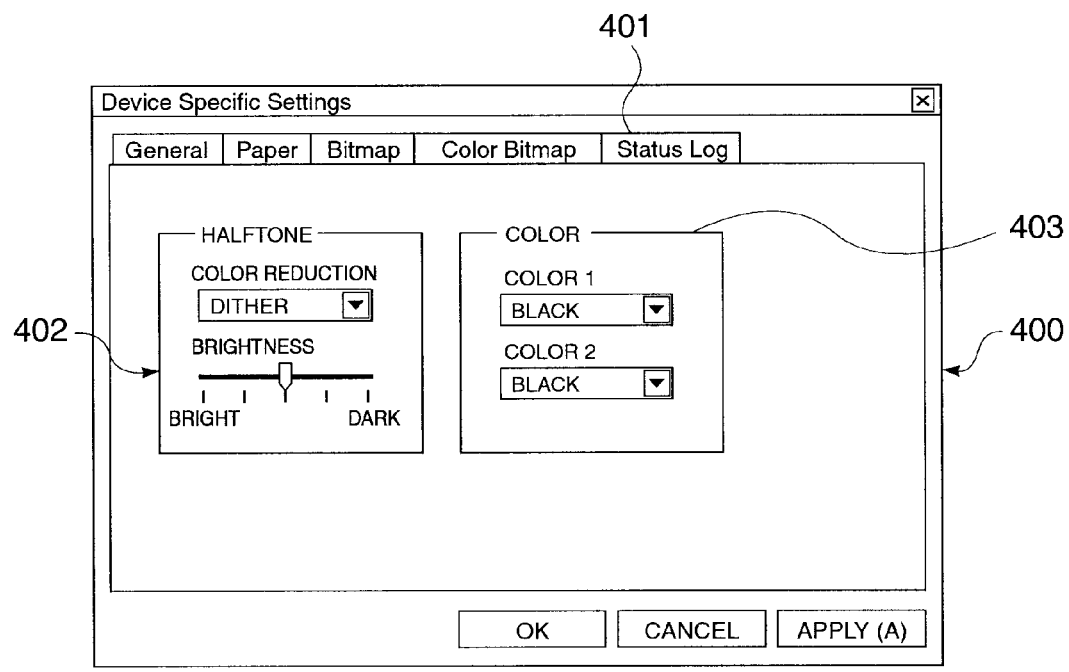
FIG. 24 shows an exemplary screen for controlling the image adjustment settings in OPOS.

This is described more fully with reference to FIG. 23 and FIG. 24. FIG. 23 shows the basic concept of OPOS. Device 74 can be a printer or customer display, and is described below as a printer.

OPOS provides a device-independent interface for printers and other peripherals for POS application programs based on standardized specifications running under Windows. For the POS application 70 to output from printer 74, it passes the data to the printer control object (CO) 71, which passes the data to the service object (SO) 72 corresponding to the model of the output printer, and the operating system (OS) (Windows) 73 then passes the data to the printer 74. If the printer 74 is a two or three color printer, images with more colors must be reduced to the printable colors for printing.

With the device control system provided by OPOS the service object 72 primarily runs a specific process for each particular device 74. The color reduction function, color assignment or selection function, or a function enabling a user to easily control the settings of these operations as described in the present invention can therefore be built in to the service object 72 so that the print data is converted to printable image data before it is sent through the OS 73 to the printer 74 for printing.

In other words, if full-color print data is sent from the POS application 70 to the device control system provided by OPOS, the full-color print data is converted in the service object 72 to two-color data for the POS printer based on the defined color reduction method and color assignment parameters, and then sent via the OS 73 to the printer 74. This conversion process is possible by designing the service object 72 so that the process for converting full color data to two-color data, including the image processing, brightness, and color parameters, can be set as desired. Furthermore, if the service object 72 performs the conversion process, the individual applications will not need to run a process for converting full color data to two-color data, and application development will be easier.

A dialog box 400 for controlling this conversion process is shown in FIG. 24. The service object 72 is written to include an image adjustment service routine including, for example, color reduction from a full color image, controlled through a dialog box such as shown in FIG. 24. If color bitmap 401 is selected, for example, a halftone control box 402 such as described with the properties input dialog box shown in FIG. 15 is presented so that the color reduction method, brightness, and other parameters can be set. The printable first and second colors can also be specified using the color selection box 403. These functions are the same as described above with reference to the image properties dialog boxes, and further description is therefore omitted here.

A particular image file can be automatically converted to two colors for printing by setting these preferences for the service object 72. The settings can also be changed as desired according to the specific image. The service object dialog box can also be configured so that various tones can also be used as shown in FIG. 17.

ADVANTAGES OF THE INVENTION

The present invention enables the user to assign or select colors to specific parts of the source data and determine the color reduction method while viewing the actual colors of the source data.

The source data resulting from the image adjustment process is also displayed on screen as the edited image by the logo data display 15 (FIG. 1). The user can therefore confirm from the image displayed on screen what kind of print image will result from the selected parameters. The settings can also be changed while viewing the image resulting from the parameters on screen.

The image receipt resulting from the source data can therefore be confirmed on screen, and the logo data resulting from the image process after the settings are defined can be confirmed. It is therefore easy to determine what settings to use before data input, the results on the image can be visually confirmed after the settings are made, and the conversion process can be quickly and easily completed.

An image reducer 17 (FIG. 4) applies an image reduction process to display reduced views of the source data and final logo data. Both the source data and final logo data can therefore be compared on the same screen, making the image adjustment process even more efficient.

Logos optimized for a different printing purposes can therefore be easily created, stored, and changed as needed. Color logos can therefore be printed for the greatest effect.

Furthermore, color reduction, color conversion, and other processes can be separately applied to the individual objects of a source image (source data) containing multiple overlapping image data and text data objects. Precise, subtle image adjustment can therefore be applied to the individual objects when creating a logo printed in color for a particular advertising, coupon, gift certificate, announcement, or other printing purpose.

The present invention can also convert image data to a gray scale image by extracting only the brightness information. A desired printing color can then be assigned by the user to the resulting gray scale image data so that the image is presented using halftones of the desired color.

By thus being able to convert logo data to gray scale expression in a desired color at the time the logo data is created, the source data does not need to be pre-converted to gray scale levels in a particular color, and a more convenient tool for generating logo data can be provided. Furthermore, the ability to preview the logo data using a variety of patterns and designs as it is being created is particularly effective when designing the logo. Yet further, being able to apply this gray scale process to individual objects makes it possible to provide an even more effective, efficient logo data generating system.

The present invention also displays a clear, sharp reduced preview of the processed source data, enabling the user to confirm the image that will actually be printed. The user can therefore more easily set the best image processing parameters. This is particularly useful when making subtle adjustments to shades of color when creating a logo because the image resulting from the image processing parameters can be confirmed on screen at the same time. Logo design and creation is therefore faster.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

While the invention has been described in conjunction with several specific embodiments, it is evident to those skilled in the art that many further alternatives, modifications and variations will be apparent in light of the foregoing description. Thus, the invention described herein is intended to embrace all such alternatives, modifications, applications and variations as may fall within the spirit and scope of the appended claims.

What is claimed is:

1. A print data generating method, comprising:
A point-of-sale terminal executing the following steps:
identifying a width dimension of a printable medium on which the print data is to be printed;
obtaining original source data;
receiving at least a user-requested change in the size of the original source data and a user-requested change in the number of colors of the original source data;
automatically resizing the original source data to a pre-defined maximum width not greater than the width dimension of the printable medium prior to executing any user-requested changes; and
displaying a first image representation of the original source data:
wherein the change in size request is executed prior to executing the change in the number of colors request.

2. The print data generating method of claim 1, wherein the change in the size of the original source data is a reduction in the size of the original source data, and the change in the number of colors of the original source data is a reduction in the number of colors in the original source data.

3. The print data generating method of claim 1, wherein the source data is logo data.

4. The print data generating method of claim 1, wherein the displaying step is performed after the automatically resizing step.

5. The print data generating method of claim 1, wherein the displaying step is performed after the user-requested changes are executed.

6. A print data generating system, comprising:
Point-of-sale terminal having:
- a parameter capture component that identifies a width dimension of a printable medium on which the print data is to be printed;
- a source data capture component that obtains original source data;
- a resizer that automatically resizes the original source data to a predefined maximum width not greater than the width dimension of the printable medium prior to executing any user-requested changes;
- a display that displays a first image representation of the original source data;
- a first parameter input component that accepts a first user-request to change the size of the original source data; and
- a second parameter input component that accepts a second user-request to change the number of colors of the original source data;

wherein the system is further configured to execute the user-request to change the size of the original source data prior to executing the user-request to change the number of colors of the original source data.

7. The print data generating method of claim 1, wherein said step of identifying a width dimension of a printable medium includes avoiding identification of any information on the length dimension of the printable medium.

8. The print data generating system of claim 6, wherein said parameter capture component avoids identification of a length dimension of the printable medium on which the print data is to be printed.

9. The print data generating method of claim 1, wherein said printable medium is sales receipt paper.

10. The print data generating system of claim 6, wherein said printable medium is sales receipt paper.

* * * * *